(12) United States Patent
Qian et al.

(10) Patent No.: US 11,101,947 B2
(45) Date of Patent: Aug. 24, 2021

(54) METHOD AND APPARATUS FOR DETERMINING SCHEDULING USER, AND SYSTEM

(71) Applicant: HUAWEI TECHNOLOGIES CO., LTD., Shenzhen (CN)

(72) Inventors: Feng Qian, Shanghai (CN); Li Wan, Shanghai (CN); Qunfang Lou, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 96 days.

(21) Appl. No.: 16/591,705

(22) Filed: Oct. 3, 2019

(65) Prior Publication Data

US 2020/0036490 A1 Jan. 30, 2020

Related U.S. Application Data

(63) Continuation of application No. PCT/CN2017/080257, filed on Apr. 12, 2017.

(51) Int. Cl.
*H04L 5/00* (2006.01)
*H04B 7/024* (2017.01)

(52) U.S. Cl.
CPC .......... *H04L 5/0035* (2013.01); *H04B 7/024* (2013.01); *H04L 5/006* (2013.01); *H04L 5/0042* (2013.01); *H04L 5/0073* (2013.01); *H04L 5/0075* (2013.01)

(58) Field of Classification Search
CPC ..... H04B 7/024; H04L 5/0042; H04L 5/0075; H04L 5/0073
See application file for complete search history.

(56) References Cited

U.S. PATENT DOCUMENTS

| | | | | |
|---|---|---|---|---|
| 2009/0279486 A1* | 11/2009 | Kishigami | ........... | H04B 7/0695 370/329 |
| 2012/0122507 A1 | 5/2012 | Gao et al. | | |
| 2012/0219043 A1* | 8/2012 | Ko | ........ | H04B 7/0639 375/219 |
| 2013/0136062 A1* | 5/2013 | Gorokhov | ............ | H04B 7/0626 370/328 |
| 2014/0348100 A1* | 11/2014 | Ratasuk | ................ | H04L 5/0048 370/329 |

(Continued)

FOREIGN PATENT DOCUMENTS

| | | |
|---|---|---|
| CN | 102547997 A | 7/2012 |
| CN | 102685876 A | 9/2012 |

(Continued)

*Primary Examiner* — Fahmida S Chowdhury
(74) *Attorney, Agent, or Firm* — Maier & Maier, PLLC

(57) ABSTRACT

A method and an apparatus for determining a scheduling user and a system. The method includes: determining a first pre-scheduling user at a second moment from a user in the first cell at a first moment; determining a first transmit weight of the first cell at the second moment; receiving a second transmit weight at the second moment that is sent by a second base station to which a second cell belongs in a data transmission system; calculating a signal to interference plus noise ratio SINR of each user in the first cell at the second moment based on the first transmit weight and the second transmit weight; and selecting a target scheduling user at the second moment from the user in the first cell based on the SINR of each user at the second moment.

14 Claims, 8 Drawing Sheets

(56) References Cited

U.S. PATENT DOCUMENTS

2015/0023317 A1* 1/2015 Yokomakura ............ H04L 1/20
370/330
2015/0092684 A1* 4/2015 Cheng ............... H04W 72/1263
370/329

FOREIGN PATENT DOCUMENTS

| CN | 103281792 A | 9/2013 |
| CN | 105392200 A | 3/2016 |
| EP | 2677813 A1 | 12/2013 |
| WO | 2013051510 A1 | 4/2013 |
| WO | 2013/092469 A1 | 6/2013 |
| WO | 2015/085494 A1 | 6/2015 |

* cited by examiner

METHOD AND APPARATUS FOR DETERMINING SCHEDULING USER, AND SYSTEM

CROSS-REFERENCE TO RELATED APPLICATIONS

This application is a continuation of International Application No. PCT/CN2017/080257, filed on Apr. 12, 2017, the disclosure of which is hereby incorporated by reference in its entirety.

FIELD

This application relates to the communications field, and in particular, to a method and an apparatus for determining a scheduling user, and a system.

BACKGROUND

A multiple-input multiple-output (MIMO) beamforming technology is a beamforming method in which a transmit signal is weighted by using channel information to form a beam. In the MIMO beamforming technology, a number of transmit antennas and a number of receive antennas are respectively used at a transmit end and a receive end, so that signals are transmitted through the number of antennas at the transmit end and the receive end.

However, due to factors such as a gradually increased quantity of deployed cells in a network, a gradually decreased distance between cells, and gradually increased load, mutual interference between different cells on a same time-frequency resource is increasingly strong. Therefore, a downlink coordinated multipoint (CoMP) transmission function is introduced, to enhance high-speed signal transmission coverage, and increase a cell edge rate and an average system rate through inter-cell coordination.

Currently, the downlink CoMP technology provides a coordinated beamforming (CBF) technology in which mutual interference can be reduced by coordinating beamforming directions of cells, to obtain a system gain. For example, when a cell A and a cell B each serve one user equipment (UE) (which is referred to as a user) on a same time-frequency resource, but interference of a downlink signal from the cell A to a user in the cell B is relatively strong, interference avoidance may be implemented by coordinating a transmit weight of the cell A. For example, a target scheduling user and a weight of the target scheduling user at an actual sending moment may be estimated in advance. When the target scheduling user needs to perform interference avoidance, transmit weights of the cell A and the cell B are obtained, the weight of the target scheduling user at the actual sending moment is adjusted based on the transmit weights of the cell A and the cell B, and then data is transmitted to the target scheduling user at the actual sending moment based on an adjusted weight.

An existing long term evolution (LTE) system usually includes two network architectures: a centralized network architecture and a distributed network architecture. A signal transmission delay between inter-station neighboring cells in the centralized network architecture is far lower than a signal transmission delay between inter-station neighboring cells in the distributed network architecture. In the CBF technology, to implement interference avoidance, each cell needs to know related information such as scheduling information of a neighboring cell and a channel from a base station to a user in the neighboring cell, so as to adjust a corresponding weight. However, in the current distributed network architecture, due to a relatively high signal transmission delay between the inter-station neighboring cells and a relatively high requirement for real-time interference avoidance, a transmit weight may easily become invalid for a target scheduling user at an actual scheduling moment. Therefore, currently, interference avoidance reliability is relatively low in the distributed network architecture.

SUMMARY

To resolve a problem of currently low interference avoidance reliability in a distributed network architecture, embodiments herein provide a method and an apparatus for determining a scheduling user, and a system. The embodiments are as follows.

According to a first embodiment, a method for determining a scheduling user is provided, and is applied to a first base station in a data transmission system, where the first base station includes at least two antennas, the first base station manages a first cell, and the method includes:

determining a first pre-scheduling user at a second moment from a user in the first cell at a first moment, where the second moment is later than the first moment, for example, the first pre-scheduling user at the second moment may be determined from the user in the first cell at the first moment according to a proportional fair principle;

determining a first transmit weight of the first cell at the second moment;

receiving a second transmit weight at the second moment that is sent by a second base station to which a second cell belongs in the data transmission system, where the second cell includes a neighboring cell that meets a preset interaction condition and that is in a neighboring cell of the first cell;

calculating a signal to interference plus noise ratio SINR of each user in the first cell at the second moment based on the first transmit weight and the second transmit weight; and selecting a target scheduling user at the second moment from the user in the first cell based on the SINR of each user at the second moment.

According to the method for determining a scheduling user provided in this embodiment, after determining the first pre-scheduling user at the second moment from the user in the first cell at the first moment, the first base station calculates the SINR of each user in the first cell at the second moment based on the first transmit weight and the second transmit weight without adjusting transmit weights of the first cell and an associated neighboring cell of the first cell, and selects the target scheduling user at the second moment from the user in the first cell based on the SINR of each user at the second moment. The SINR is obtained through calculation based on the transmit weights of the first cell and the associated neighboring cell of the first cell, and therefore is more accurate than an SINR obtained through calculation based on a CQI. Therefore, the target scheduling user that best meets the transmit weight at the second moment can be more accurately determined, so as to avoid a case in which the transmit weight is invalid in actual scheduling, thereby improving interference avoidance reliability.

When the data transmission system is a time division duplex (TDD) system or a frequency division duplex (FDD) system, an SINR of a first user is calculated using a different method. In this embodiment, the following two implementations are used as examples for description.

In a first implementable manner, when the data transmission system is the TDD system, the calculating a signal to interference plus noise ratio SINR of each user in the first cell at the second moment based on the first transmit weight and the second transmit weight includes:

calculating an SINR of a first user k at the second moment by using a first signal-to-noise ratio calculation formula based on the first transmit weight and the second transmit weight, where the first signal-to-noise ratio calculation formula is as follows:

$$SINR_{k,l} = \frac{|H_{i,k} * w_{i,l}|^2}{\text{noise} + \sum_{y=1}^{Y} \sum_{f=1}^{F_y} |H_{y,k} * w_{y,f}|^2},$$

where the first user k is any user in the first cell at the second moment; $SINR_{k,l}$ represents an SINR of an $l^{th}$ stream of the first user k at the second moment; $H_{i,k}$ represents a channel from the first base station i to the first user k; y represents a target neighboring cell of the first user k, and the target neighboring cell is one of neighboring cells that can be measured by the first user k in the second cell; $H_{y,k}$ represents a channel from the neighboring cell y to the first user k; "noise" represents a noise floor of the first user; Y represents a total quantity of neighboring cells that can be measured by the first user k in the second cell; $w_{y,f}$ represents a transmit weight of an $f^{th}$ stream of the target neighboring cell y at the second moment; and Fy represents a total quantity of transmit streams of the target neighboring cell y at the second moment.

It can be understood from the foregoing description that in the TDD system, an SINR of any user in the cell is positively correlated with a product of a channel of the user and a transmit weight, and is negatively correlated with a product of a channel of a neighboring cell that can be measured by the user and a transmit weight. An SINR obtained through calculation by using the first signal-to-noise ratio calculation formula is more accurate than an SINR determined based on a CQI reported by a user.

In a second implementable manner, when the data transmission system is the frequency division duplex (FDD) system, the calculating a signal to interference plus noise ratio SINR of each user in the first cell at the second moment based on the first transmit weight and the second transmit weight includes:

calculating an SINR of a first user k at the second moment by using a second signal-to-noise ratio calculation formula based on the first transmit weight and the second transmit weight, where the second signal-to-noise ratio calculation formula is as follows:

$$SINR_{k,l} = \frac{RSRP_{k,i} * |w_{k,SU,l}^H * w_{k,CBF,l}|^2}{\text{noise} + \sum_{y=1}^{Y} \sum_{f=1}^{F_y} |\sqrt{RSRP_{k,y}} * w_{k,y}^H * w_{y,f}|^2},$$

where the first user k is any user in the first cell at the second moment; $SINR_{k,l}$ represents an SINR of an $l^{th}$ stream of the first user k at the second moment; $RSRP_{k,i}$ represents an SINR measured by the first user k at the second moment from the first cell i to the first user; H represents calculating a conjugate transpose matrix; y represents a target neighboring cell of the first user k, and the target neighboring cell is one of neighboring cells that can be measured by the first user k in the second cell; $RSRP_{k,y}$ represents reference signal received power (RSRP) measured by the first user k at the second moment from the target neighboring cell y to the first user k; Y represents a total quantity of neighboring cells that can be measured by the first user k in the second cell; Fy represents a total quantity of transmit streams of the target neighboring cell y at the second moment; $w_{y,f}$ represents a transmit weight of an $f^{th}$ stream of the target neighboring cell y at the second moment; $w_{k,y}$ is used to represent a channel from the target neighboring cell y to the first user k; and a dimension of $w_{k,y}$ is the same as a dimension of $w_{y,f}$ and is represented by quantities of rows and columns of a precoding matrix corresponding to a PMI that is measured by the first user k based on information that a quantity of streams of the first user k is 1 and that is reported to the first base station; and when coordinated beamforming CBF weight adjustment is performed on the first cell between the first moment and the second moment, $w_{k,SU,l}$ represents a transmit weight of the $l^{th}$ stream of the first user k before the CBF weight adjustment, and $w_{k,CBF,l}$ represents a transmit weight of the $l^{th}$ stream of the first user k after the CBF weight adjustment; or when coordinated beamforming CBF weight adjustment is not performed on the first cell between the first moment and the second moment, $w_{k,SU,l}$ is equal to $w_{k,CBF,l}$ and represents a transmit weight of the $l^{th}$ stream of the first user k at the second moment.

It can be noted that the dimension of $w_{k,y}$ may be represented by the quantities of rows and columns of the precoding matrix corresponding to the PMI that is measured by the first user k based on the information that the quantity of streams of the first user k is 1 and that is reported to the first base station.

It can be understood from the foregoing description that in the FDD system, an SINR of any user in the cell is positively correlated with a product of a channel of the user and a transmit weight and RSRP of the user, and is negatively correlated with a product of a channel of a neighboring cell that can be measured by the user and a transmit weight and RSRP of the neighboring cell that can be measured by the user. An SINR obtained through calculation by using the second signal-to-noise ratio calculation formula is more accurate than an SINR determined based on a CQI reported by a user.

Optionally, after the determining a first pre-scheduling user at a second moment from a user in the first cell, the method further includes:

obtaining a user measurement set of the first pre-scheduling user, where the user measurement set of the first pre-scheduling user is used to record an interference source neighboring cell that interferes with the first pre-scheduling user and a degree of interference of RSRP of the interference source neighboring cell to the first pre-scheduling user;

receiving pre-scheduling information sent by a third base station to which a third cell belongs, where the pre-scheduling information includes a user measurement set of a third pre-scheduling user, the third pre-scheduling user is a pre-scheduling user at the second moment that is determined by the third base station at the first moment, the user measurement set of the third pre-scheduling user is used to record an interference source neighboring cell that interferes with the third pre-scheduling user and a degree of interference of RSRP of the interference source neighboring cell to the third pre-scheduling user, and the third cell is a cell that is in the neighboring cell of the first cell and that is interfered with by the first cell or all neighboring cells of the first cell; and determining, based on the user measurement set of the first pre-scheduling user and the user measurement set of the third pre-scheduling user, whether the first pre-scheduling user is a CBF to-be-adjusted user.

The process of obtaining the user measurement set of the first pre-scheduling user may include a process of determining whether the first pre-scheduling user is a CBF candidate user. Details include:

The first base station obtains a sum $\Sigma RSRP_g$ of RSRP that is of all neighboring cells of the first pre-scheduling user and that is received by the first pre-scheduling user, where g is a total quantity of neighboring cells of the first pre-scheduling user; the first base station determines a sum of interference to the first pre-scheduling user, where the sum of the interference is equal to a sum of $\Sigma RSRP_g$ and the noise floor noise of the first pre-scheduling user; the first base station sorts the RSRP of all the neighboring cells of the first pre-scheduling user in descending order (descending order); and the first base station determines, based on the sorted RSRP of all the neighboring cells, whether the first pre-scheduling user is a CBF candidate user.

In an implementable manner, a process in which the first base station determines, based on the sorted RSRP of all the neighboring cells, whether the first pre-scheduling user is a CBF candidate user includes the following steps:

It is set that i=1, and the following steps are performed.

Step A. Detect a value of i, and perform step B or C.

Step B. If 1≤i≤n, obtain a sum of the first i sorted RSRP, where n is a preset threshold of a quantity of detection times, and perform step D.

Step C. If i>n, determine that the first pre-scheduling user is not a CBF candidate user, and end an action.

Step D. Determine whether a ratio of the sum of the first i RSRP to the sum of the interference is greater than a preset signal to interference plus noise ratio, and perform step E or F.

Step E. When the ratio of the sum of the first i RSRP to the sum of the interference is greater than the preset signal to interference plus noise ratio, determine that the first pre-scheduling user is a CBF candidate user.

Step F When the ratio of the sum of the first i RSRP to the sum of the interference is not greater than the preset signal to interference plus noise ratio, update i, so that updated i is equal to i+l, and repeatedly perform step A to step F.

Then, when the first pre-scheduling user is a CBF candidate user, the user measurement set is established for the first pre-scheduling user. In actual application, regardless of whether the first pre-scheduling user is a CBF candidate user, the first base station may establish the user measurement set of the first pre-scheduling user for the first pre-scheduling user; and the first base station may record, in the user measurement set, whether the first pre-scheduling user is a CBF candidate user.

In this embodiment, the second cell is an associated neighboring cell of the first cell, and the second cell is the neighboring cell that meets the preset interaction condition and that is in the neighboring cell of the first cell. The preset interaction condition is defined based on a specific transmission scenario.

The neighboring cell that meets the preset interaction condition and that is in the neighboring cell of the first cell may be a base station to which the first base station sends a user measurement set within preset duration; in other words, the second cell is a base station to which the first base station sends the user measurement set within the preset duration. The preset duration is greater than or equal to a time interval between the first moment and the second moment. Optionally, the preset duration may be eight timeslots. In this scenario, the first base station receives a transmit weight sent by a base station to which the first base station previously sends the user measurement set of the first pre-scheduling user; in other words, each of base stations that are determined by the first base station and to which interference source cells that previously interfere with or are currently interfering with the first pre-scheduling user belong feeds back a transmit weight of the base station at the second moment to the first base station.

Correspondingly, after determining the first transmit weight of the first cell at the second moment, the first base station may send the first transmit weight to a base station to which an associated neighboring cell belongs. The base station to which the associated neighboring cell belongs is a base station that sends a user measurement set to the first base station within the preset duration.

For example, when the first pre-scheduling user is a CBF to-be-adjusted user, the first transmit weight is sent to the base station to which the associated neighboring cell belongs, and the first transmit weight is a weight obtained after the CBF weight adjustment.

When the first pre-scheduling user is not a CBF to-be-adjusted user, the first transmit weight is sent to the base station to which the associated neighboring cell belongs, and the first transmit weight is a weight on which no CBF weight adjustment is performed.

Alternatively, the neighboring cell that meets the preset interaction condition and that is in the neighboring cell of the first cell may be all the neighboring cells of the first cell; in other words, the second cell is all the neighboring cells of the first cell. In this scenario, the first base station receives transmit weights sent by base stations to which all neighboring cells of the first base station belong; in other words, all the base stations to which the neighboring cells of the first base station belong feed back the transmit weights of the base stations at the second moment to the first base station.

Correspondingly, after determining the first transmit weight of the first cell at the second moment, the first base station may send the first transmit weight to the base stations to which all the neighboring cells of the first cell belong. In this scenario, because the second cell is all the neighboring cells of the first cell, the first base station may send the first transmit weight to the second base station.

For example, when the first pre-scheduling user is not a CBF to-be-adjusted user, the first transmit weight is sent to the second base station, and the first transmit weight is a weight on which no CBF weight adjustment is performed.

When the first pre-scheduling user is a CBF to-be-adjusted user, the first transmit weight is sent to the second base station, and the first transmit weight is a weight obtained after the CBF weight adjustment.

Optionally, the selecting a target scheduling user at the second moment from the user in the first cell based on the SINR of each user at the second moment includes:

determining a modulation and coding scheme MCS of each user at the second moment based on the SINR of each user at the second moment;

determining spectrum efficiency of each user at the second moment based on the MCS of each user at the second moment; and selecting the target scheduling user at the second moment from the first cell based on the spectrum efficiency of each user at the second moment according to a proportional fair principle.

Based on the proportional fair principle, a user with a highest priority that best meets the transmit weight at the second moment can be found without adjusting transmit weights of the first cell and an associated neighboring cell of the first cell, and the user is selected as the target scheduling user, so as to avoid a case in which the transmit weight is invalid in actual scheduling, thereby improving interference avoidance reliability.

Optionally, the pre-scheduling information further includes channel state information (CSI) of the third pre-scheduling user; and the determining a first transmit weight of the first cell includes:

obtaining CSI of a CBF coordinated user from the CSI of the third pre-scheduling user when the first pre-scheduling user is a CBF to-be-adjusted user, where the CBF coordinated user is the first n users that are most severely interfered with by the first cell in the third pre-scheduling user and that are determined by the first base station, and n is a threshold of a quantity of users that can be coordinated in the first cell; and determining the first transmit weight of the first cell based on CSI of the first pre-scheduling user and the CSI of the CBF coordinated user by using eigenvector zero forcing (EZF), regularized eigenvector zero forcing (REZF), or a maximum signal to leakage plus noise ratio (SLNR).

According to a second embodiment, an apparatus for determining a scheduling user is provided, and is applied to a first base station in a data transmission system, where the first base station includes at least two antennas, the first base station manages a first cell, and the apparatus includes at least one module configured to perform the method for determining a scheduling user provided in the first embodiment.

According to a third embodiment, an apparatus for determining a scheduling user is provided, where the apparatus includes a processor, a transmitter, and a receiver, and the processor is configured to implement the method for determining a scheduling user provided in the first embodiment.

According to a fourth embodiment, a computer readable storage medium is provided, where the computer readable storage medium stores an instruction, and when the computer readable storage medium runs on a computer, the computer is enabled to perform the method for determining a scheduling user provided in the first embodiment.

According to a fifth embodiment, a computer program product that includes an instruction is provided, and when the computer program product runs on a computer, the computer is enabled to perform the method for determining a scheduling user provided in the first embodiment.

According to a sixth embodiment, a data transmission system is provided, including: at least two base stations, where the at least two base stations include the first base station, and the first base station includes the apparatus for determining a scheduling user in the second embodiment or the third embodiment.

In the embodiments, after determining the first pre-scheduling user at the second moment from the user in the first cell at the first moment, the first base station finds, without adjusting transmit weights of the first cell and an associated neighboring cell of the first cell, a user with a highest priority that best meets the transmit weight at the second moment, and selects the user as the target scheduling user, so as to avoid a case in which the transmit weight is invalid in actual scheduling, thereby improving interference avoidance reliability.

Further, according to the method for determining a scheduling user provided in the embodiments, the neighboring cell may be an inter-station neighboring cell, or may be an intra-station neighboring cell, and a case in which a transmit weight is invalid in actual scheduling can be effectively avoided particularly in a scenario in which an interaction delay between inter-station neighboring cells is relatively high. In addition, in the embodiments, scheduling is performed twice, so that in the data transmission system, overall coordinated interference management can be performed, and a scheduling process is combined with coordination, thereby overcoming a disadvantage that scheduling and coordination are previously separated.

BRIEF DESCRIPTION OF DRAWINGS

FIG. 1-2 is a schematic diagram of a centralized network architecture according to an embodiment;

FIG. 1-3 is a schematic diagram of a distributed network architecture according to an embodiment;

FIG. 1-4 is a schematic diagram of a scenario in which a transmit weight is invalid according to an embodiment;

FIG. 2-1 is a schematic flowchart of a method for determining a scheduling user according to an embodiment;

FIG. 2-2 is a schematic flowchart of determining whether a first pre-scheduling user is a CBF to-be-adjusted user according to an embodiment;

FIG. 2-3 is a schematic flowchart of selecting a target scheduling user at a second moment from a user in a first cell based on an SINR of each user at the second moment according to an embodiment;

FIG. 2-4 is another schematic flowchart of a method for determining a scheduling user according to an embodiment;

FIG. 3-1 is a schematic structural diagram of an apparatus for determining a scheduling user according to an embodiment;

FIG. 3-2 is another schematic structural diagram of an apparatus for determining a scheduling user according to an embodiment;

FIG. 3-3 is still another schematic structural diagram of an apparatus for determining a scheduling user according to an embodiment; and FIG. 4 is yet another schematic structural diagram of an apparatus for determining a scheduling user according to an embodiment.

DESCRIPTION OF EMBODIMENTS

To make the objectives, technical solutions, and advantages of embodiments clearer, the following further describes the implementations of this application in detail with reference to the accompanying drawings.

Figure 1:
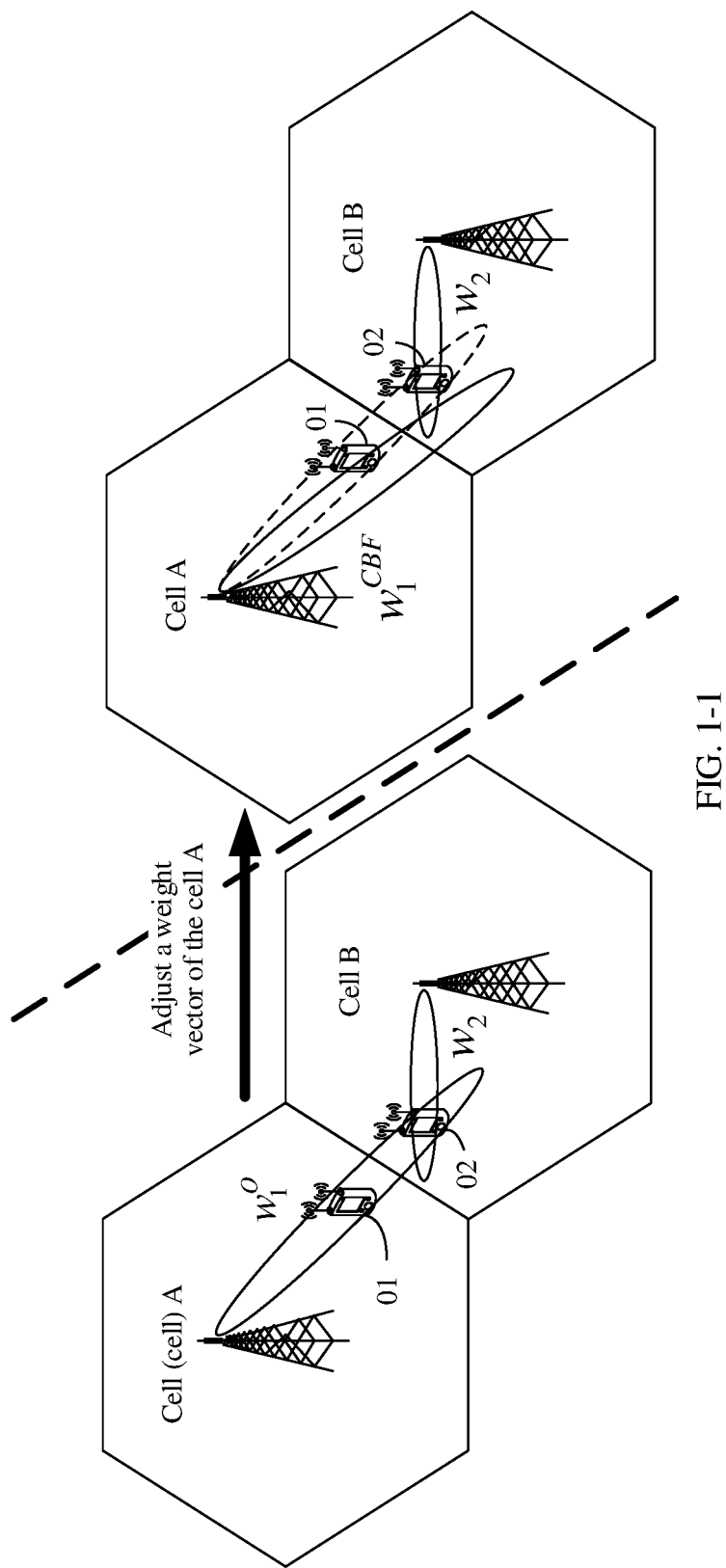
FIG. 1-1 is a schematic diagram of a CBF principle in a method for determining a scheduling user according to an embodiment.

FIG. 1-1 is a schematic diagram of a CBF principle in a method for determining a scheduling user according to an embodiment. A left part and a right part of FIG. 1-1 respectively illustrate a downlink signal sending status before CBF is performed and a downlink signal sending status after the CBF is performed, in a data transmission system in a method for determining a scheduling user. As shown in FIG. 1-1, it is assumed that the data transmission system includes two cells: a cell A and a cell B. As shown in the left part of FIG. 1-1, it is assumed that the two cells each serve one user on a same time-frequency resource. The cell A serves a first user 01, and a corresponding weight vector is $\omega_1^O$; and the cell B serves a second user 02, and a corresponding weight vector is $\omega_2$. It can be understood from FIG. 1-1 that before the CBF is performed, a direction in which the cell A sends a downlink signal to the first user 01 points to the second user 02, and consequently, interference of the downlink signal to the second user 02 in the cell B is strong. As shown in the right part of FIG. 1-1, after weight vector adjustment is performed by using a CBF technology, the cell A serves the first user 01, and the corresponding weight vector is adjusted to $\omega_1^{CBF}$; and the cell B serves the second user 02, and the corresponding weight vector remains unchanged, and is still $\omega_2$. It can be understood from FIG. 1-1 that after the CBF is performed, the weight vector is correspondingly adjusted, and a direction in which the cell A sends the downlink signal to the first user 01 deviates from the second user 02 compared with that before the adjustment, and therefore signal interference is reduced.

Figures 1, 2:
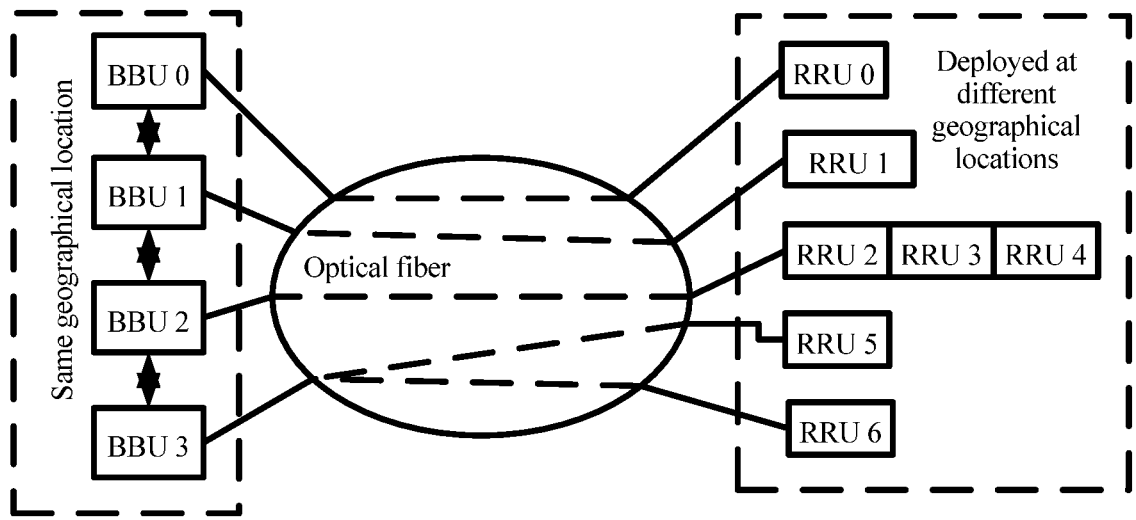
Figures 1, 2, 3:
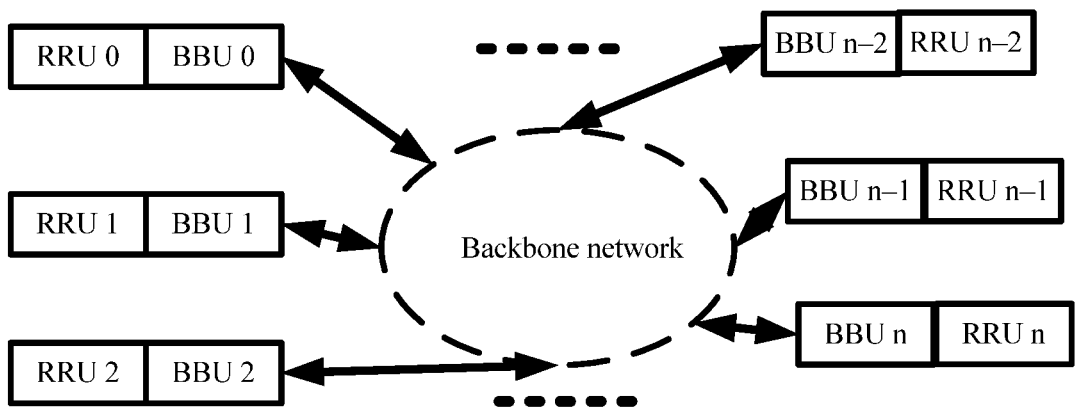

It can be noted that based on different manners of deploying a baseband processing unit (BBU), the data transmission system includes two network architectures: a centralized network architecture (for example, BBUs are deployed in a centralized manner) shown in FIG. 1-2 and a distributed network architecture (for example, BBUs are deployed in a distributed manner) shown in FIG. 1-3. As shown in FIG. 1-2, the centralized network architecture includes a number of remote radio units (RRU) and BBUs. Each RRU constitutes one cell, the number of RRUs are located at different geographical locations, and the number of RRUs are connected to their respective BBUs by using connection components, such as optical fibers. The BBUs are located at a same geographical location. In FIG. 1-2, it is assumed that there are four BBUs: a BBU 0 to a BBU 3, and there are seven RRUs: an RRU 0 to an RRU 6. The BBU 0 to the BBU 3 are deployed in a centralized manner, and the RRU 0 to the RRU 6 are deployed in a distributed manner. Because the RRU 2 to the RRU 4 are closely deployed, it may also be considered that the three RRUs are deployed in the centralized manner. The BBU 0 is connected to the RRU 0, the BBU 1 is connected to the RRU 1, the BBU 2 is connected to the RRU 2 to the RRU 4, and the BBU 3 is connected to the RRU 5 and the RRU 6. Because the BBUs are deployed in the centralized manner, a transmission distance between the BBUs is relatively short. Therefore, interaction between the BBUs is ideal in terms of synchronization, an interaction delay, and an interaction bandwidth. It can be noted that the network architecture in FIG. 1-2 is merely an example for description, and a specific architecture of the centralized network architecture is not limited in the embodiments.

As shown in FIG. 1-3, the distributed network architecture includes a number of RRUs and BBUs. Each RRU constitutes one cell, and the number of RRUs are located at different geographical locations. An RRU and a BBU that belong to a same cell are closely deployed. BBUs in different cells are located at different geographical locations, and transmit signals through a backbone network. In FIG. 1-3, it is assumed that there are n+1 BBUs: a BBU 0 to a BBU n, and there are n+1 RRUs: an RRU 0 to an RRU n, where n≥0. The n+1 BBUs are deployed in a distributed manner, and the n+1 BBUs are respectively connected to the n+1 RRUs. Because the BBUs are deployed in the distributed manner, a signal between the BBUs needs to be transmitted for a long distance through the backbone network. Therefore, an interaction delay between the BBUs is relatively high, and information such as scheduling information of a neighboring cell and a channel from a base station to a user in the neighboring cell cannot be obtained in real time. It can be noted that the network architecture in FIG. 1-3 is merely an example for description, and a specific architecture of the distributed network architecture is not limited in the embodiments.

To implement interference avoidance, each cell needs to know related information such as scheduling information of a neighboring cell and a channel from a base station to a user in the neighboring cell, so as to adjust a corresponding weight. Referring to FIG. 1-1, in an existing CBF implementation process, it is assumed that after performing scheduling in a first subframe, a cell A may know a scheduling result of a cell B (a neighboring cell of the cell A) in the first subframe and channel state information (CSI) of a channel from a scheduling user in the cell B in the first subframe to the cell A. To meet this assumption, CBF is be performed in a network system with a centralized architecture, and BBUs in all cells need to be located at a same geographical location, so as to ensure a very ideal backhaul delay and bandwidth between the BBUs.

However, in an existing LTE communications network, BBUs are usually deployed in a distributed manner, and are located at different geographical locations. To implement deployment with a centralized architecture, it is costly to reconstruct the existing network. Even if a centralized network architecture is used in a newly constructed network system, massive high-performance optical fiber connections are usually required between RRUs and BBUs, and construction costs are still relatively high. It can be understood from the analysis that it is easy but costly to implement CBF in a system with the centralized architecture. In a current distributed network architecture, a signal transmission delay between inter-station neighboring cells is relatively high, and there is a relatively high requirement for real-time interference avoidance. Currently, to reduce impact of the delay on signal accuracy, in a data transmission system with the distributed network architecture, a pre-scheduling manner is usually used to notify a serving cell in advance of scheduling information of a neighboring cell of the serving cell at a future moment, that is, a scheduling status at a future moment is estimated in advance. However, in the distributed network architecture, accuracy is usually relatively low in the pre-scheduling manner.

For example, scheduling of each cell at an actual sending moment may easily change, and consequently, a previously designed transmit weight is invalid. For example, referring to FIG. 1-4, it is assumed that a data transmission system includes three cells: a cell 0, a cell 1, and a cell 2. For the cell 0, it is assumed that in the data transmission system, it is expected in advance, in a pre-scheduling manner at a pre-scheduling moment, that three users, namely, UE_A, UE_B, and UE_C, are to transmit data at a same moment. However, at an actual sending moment (the actual sending moment is a moment later than the pre-scheduling moment), a user in a neighboring cell of the cell 0 may change. For example, at the actual sending moment, three users, namely, the UE_A, the UE_B, and UE_D, actually transmit data, because a user in the cell 2, namely, a neighboring cell of the cell 0, changes from the UE_C to the UE_D. In this case, a transmit weight obtained for the UE_A and the UE_C is invalid for the UE_D. Alternatively, a served user may change. For example, at the actual sending moment, three users, namely, UE_E, the UE_B, and UE_D, actually transmit data, because a user in the cell 2, namely, a neighboring cell of the cell 0, changes from the UE_C to the UE_D, and a served user in the cell 0 changes from the UE_A to the UE_E. In this case, a transmit weight obtained for the UE_A is invalid for the UE_E. A reason for this phenomenon is that in a current scheduling solution, only a proportional fair principle is pursued in a cell, but inter-cell coordination is not considered. Consequently, a transmit weight may easily become invalid at an actual scheduling moment. Therefore, interference avoidance reliability is currently relatively low in the distributed network architecture.

To resolve a current problem, an embodiment provides a method for determining a scheduling user, and the method is applied to a first base station in a data transmission system. The first base station includes at least two antennas, and the first base station manages a first cell. For the cell, refer to the cell A shown in FIG. 1-1. As shown in FIG. 2-1, the method includes the following steps.

In step 201, the first base station determines a first pre-scheduling user at a second moment from a user in the first cell at a first moment, where the second moment is later than the first moment.

In an application, the second scheduling moment and the first scheduling moment may be preset based on a specific network architecture of the data transmission system. For example, the second scheduling moment and the first scheduling moment are separated by at least four timeslots or at least eight timeslots.

Optionally, at the first moment, the first pre-scheduling user at the second moment may be determined from the user in the first cell by using a proportional fair algorithm. The proportional fair algorithm may be a maximum proportional fair gain algorithm. A principle of the max proportional fair gain algorithm is as follows: the first cell obtains and performs scheduling for a user with a largest ratio of instantaneous channel quality to historical average channel quality. The instantaneous channel quality may be reflected by spectrum efficiency of a spectrum resource to be scheduled for a user at the second moment, and the historical average channel quality may be reflected by a total amount of data transmitted by the user before the second moment. The total amount of transmitted data is usually in a unit of bit, and therefore the total amount of data transmitted by the user before the second moment is a total quantity of bits transmitted by the user before the second moment. For example, the first pre-scheduling user may be determined by using a proportional fair formula. It is assumed that there is a transmission subframe f at the second moment. The first pre-scheduling user p that meets a proportional fair principle may meet the following proportional fair formula:

$$p = \underset{k=1,2,\ldots,K}{\arg\max} \frac{E_k(f)}{T_k(f-1)},$$

where $E_k(f)$ is spectrum efficiency of a spectrum resource to be scheduled for a user k in the subframe f, where $1 \le k \le K$, and K is a total quantity of users in a cell; $T_k(f)$ is a total amount of data transmitted by the user k before the subframe f; and $$\underset{k=1,2,\ldots,K}{\arg\max}$$

represents obtaining a maximum value from ratios of a user 1 to a user K.

Optionally, in a conventional process of obtaining $E_k(f)$ of the user k, a corresponding modulation and coding scheme (MCS) is obtained through calculation based on a channel quality indicator (CQI) of the user k in the subframe f, and then the spectrum efficiency $E_k(f)$ is determined based on the MCS. The CQI is measured by the user k, and is reported to the first base station.

Optionally, in a process of obtaining $T_k(f-1)$ of the user k, the historical average channel quality $T_k(f-1)$ of the user k is calculated by using a historical average channel quality calculation formula. The historical average channel quality calculation formula is as follows:

$$T_k(f-1) = \begin{cases} (1-\alpha)T_k(f-2) + \alpha B_k(f-1), & k = q \\ (1-\alpha)T_k(f-2), & k \ne q \end{cases},$$

where q is a scheduling user in a subframe f−1, k=q indicates that the user k is a scheduling user in the subframe f−1, k≠q indicates that the user k is not a scheduling user in the subframe f−1, α is a preset filtering parameter (0<α<1), and $B_k(f-1)$ is a transport block size (TBS), namely, a quantity of transmitted bits corresponding to each resource block in a case of the MCS, of the user k in the subframe f−1.

It can be noted that the historical average channel quality calculation formula is in essence obtained by replacing f in the following formula with f−1. For a meaning of each parameter in the formula, refer to the historical average channel quality calculation formula.

$$T_k(f) = \begin{cases} (1-\alpha)T_k(f-1) + \alpha B_k(f), & k = q \\ (1-\alpha)T_k(f-1), & k \ne q \end{cases}.$$

In an application, when data transmission is performed for the first time, the historical average channel quality may be a preset initial value; in other words, $T_k(1)$ is an initial value. The initial value may be delivered by a higher layer of a base station.

In step 202, the first base station determines whether the first pre-scheduling user is a CBF to-be-adjusted user, and performs step 203 when the first pre-scheduling user is a CBF to-be-adjusted user, or performs step 204 when the first pre-scheduling user is not a CBF to-be-adjusted user.

In this embodiment, whether CBF weight adjustment needs to be performed on the first cell at the second moment needs to be predetermined. When a downlink signal from the first cell at the second moment affects a neighboring cell, the CBF weight adjustment needs to be performed on the first cell; or when the downlink signal from the first cell at the second moment does not affect the neighboring cell, the CBF weight adjustment does not need to be performed on the first cell. Neighboring cells in this embodiment may include intra-station neighboring cells and/or inter-station neighboring cells.

It can be noted that in a CBF weight adjustment process, based on an interference relationship between downlink signals from cells, users may fall into at least two types: a CBF to-be-adjusted user and a CBF coordinated user. Interference of a downlink signal sent from a cell to the CBF to-be-adjusted user to a downlink signal sent to the CBF coordinated user is relatively strong. For example, the CBF to-be-adjusted user is a user in an interference cell that meets a preset condition, and the CBF coordinated user is an interfered user that meets another preset condition. A transmit weight obtained by the cell for the CBF to-be-adjusted user is adjusted, so that interference to the CBF coordinated user can be reduced. For example, in FIG. 1-1, a first user 01 is a CBF to-be-adjusted user, and a second user 02 is a CBF coordinated user.

In an application, each base station detects whether a pre-scheduling user in a cell managed by the base station is a CBF to-be-adjusted user, and detects whether the pre-scheduling user in the cell managed by the base station is a CBF coordinated user. In some special cases, a user may be not only a CBF to-be-adjusted user but also a CBF coordinated user. For example, a downlink signal sent to the user interferes with a downlink signal sent to a user, and is interfered with by a downlink signal sent to another user.

Therefore, as shown in FIG. 2-2, a specific process of determining whether the first pre-scheduling user is a CBF to-be-adjusted user is as follows:

In step 2021, the first base station obtains a user measurement set of the first pre-scheduling user.

The user measurement set of the first pre-scheduling user is used to record an interference source neighboring cell that interferes with the first pre-scheduling user and a degree of interference of RSRP of the interference source neighboring cell to the first pre-scheduling user.

First, the first base station may determine, based on RSRP measured from a neighboring cell of the first cell to the first pre-scheduling user, whether the first pre-scheduling user is a CBF candidate user, and establish the user measurement set for the first pre-scheduling user when the first pre-scheduling user is a CBF candidate user. The RSRP is usually measured by the first pre-scheduling user, and is reported to the first base station. In this embodiment, the CBF candidate user is a user whose degree of interference of another cell meets a specific condition, and the CBF candidate user may become a CBF coordinated user.

For example, a process in which the first base station determines whether the first pre-scheduling user is a CBF candidate user is as follows:

In step 2021a, the first base station obtains a sum $\Sigma RSRP_g$ of RSRP that is of all neighboring cells of the first pre-scheduling user and that is received by the first pre-scheduling user, where g is a total quantity of neighboring cells of the first pre-scheduling user.

In step 2021b, the first base station determines a sum of interference to the first pre-scheduling user, where the sum of the interference is equal to a sum of $\Sigma RSRP_g$ and a noise floor noise of the first pre-scheduling user.

In step 2021c, the first base station sorts the RSRP of all the neighboring cells of the first pre-scheduling user in descending order.

In step 2021d, the first base station determines, based on the sorted RSRP of all the neighboring cells, whether the first pre-scheduling user is a CBF candidate user.

In an implementable manner, step 2021d includes the following steps:

It is set that i=1, and the following steps are performed.

A. Detect a value of i, and perform step B or C.

B. If 1≤i≤n, obtain a sum of the first i sorted RSRP, where n is a preset threshold of a quantity of detection times (which is usually delivered in advance by an upper layer of a base station), and perform step D.

C. If i>n, determine that the first pre-scheduling user is not a CBF candidate user, and end an action.

D. Determine whether a ratio of the sum of the first i RSRP to the sum of the interference is greater than a preset signal to interference plus noise ratio, and perform step E or F.

E. When the ratio of the sum of the first i RSRP to the sum of the interference is greater than the preset signal to interference plus noise ratio, determine that the first pre-scheduling user is a CBF candidate user, and end an action.

F. When the ratio of the sum of the first i RSRP to the sum of the interference is not greater than the preset signal to interference plus noise ratio, update i, so that updated i is equal to i+1, and repeatedly perform step A to step F.

It is assumed that the first cell has three neighboring cells and the preset threshold of the quantity of detection times is 2. In this case, the first base station obtains a sum $\Sigma RSRP_3$ of RSRP that is of all the neighboring cells of the first pre-scheduling user and that is received by the first pre-scheduling user; determines a sum of interference to the first pre-scheduling user, where the sum of the interference is equal to a sum of $\Sigma RSRP_3$ and the noise floor noise of the first pre-scheduling user; sorts the RSRP of the three neighboring cells of the first pre-scheduling user in descending order; and then determines whether $RSRP_1$ meets formula 1:

$$\frac{RSRP_1}{\Sigma RSRP_3 + niose} > \text{Threshold}, \quad \text{(formula 1)}$$

where

Threshold is the preset signal to interference plus noise ratio.

When $RSRP_1$ meets formula 1, it is determined that the first pre-scheduling user is a CBF candidate user; or when $RSRP_1$ does not meet formula 1, it is determined whether $RSRP_1+RSRP_2$ meets formula 2:

$$\frac{RSRP_1 + RSRP_2}{\Sigma RSRP_3 + niose} > \text{Threshold}, \quad \text{(formula 2)}$$

where

Threshold is the preset signal to interference plus noise ratio.

When $RSRP_1+RSRP_2$ meets formula 2, it is determined that the first pre-scheduling user is a CBF candidate user; or when $RSRP_1+RSRP_2$ does not meet formula 2, because the threshold of the quantity of detection times is 2 and the first base station has performed detection twice, the first base station may determine that the first pre-scheduling user is not a CBF candidate user without calculating $RSRP_1+RSRP_2+RSRP_3$.

Then, when the first pre-scheduling user is a CBF candidate user, the user measurement set is established for the first pre-scheduling user.

In this embodiment it is assumed that the first pre-scheduling user is a CBF candidate user. In this case, the first base station establishes the user measurement set for the first pre-scheduling user. The user measurement set of the first pre-scheduling user is used to record the interference source neighboring cell that interferes with the first pre-scheduling user and the degree of the interference of the RSRP of the interference source neighboring cell to the first pre-scheduling user. The degree of the interference may be reflected by a ratio of the interference source neighboring cell d, which is $$\frac{RSRP_d}{\Sigma RSRP_g + niose}.$$

The ratio may also be referred to as an interference ratio.

For example, it is assumed that the first pre-scheduling user is interfered with by two interference source neighboring cells, and the preset signal to interference plus noise ratio is 70%. In this case, the user measurement set of the first pre-scheduling user is shown in Table 1. A cell number of the first cell is 1, an identifier of the first pre-scheduling user is 3, a primary interference cell of the first cell is a cell 3, a ratio of RSRP of the primary interference cell is 40%, and a ratio of RSRP of a secondary interference cell is 30%. Therefore, it can be understood that the UE 3 is interfered with by two neighboring cells: the cell 3 with an interference ratio 40% and a cell 2 with an interference ratio 30%. A sum of the interference ratios of the two cells is not greater than the signal to interference plus noise ratio 70%.

TABLE 1

| Cell number | UE identifier | Primary interference cell | Secondary interference cell |
|---|---|---|---|
| 1 | 3 | Cell 3, 40% | Cell 2, 30% |

In an application, regardless of whether the first pre-scheduling user is a CBF candidate user, the first base station may establish the user measurement set of the first pre-scheduling user for the first pre-scheduling user. The first base station may record, in the user measurement set, whether the first pre-scheduling user is a CBF candidate user. For example, the user measurement set of the first pre-scheduling user is shown in Table 2. The table records that UE 3 is a CBF candidate user. For other content, refer to Table 1.

TABLE 2

| Cell number | Whether a pre-scheduling user is a CBF candidate user | UE identifier | Primary interference cell | Secondary interference cell |
|---|---|---|---|---|
| 1 | Yes | 3 | Cell 3, 40% | Cell 2, 30% |

It can be noted that when the user measurement set of the first pre-scheduling user is shown in Table 1, the pre-scheduling user recorded in Table 1 may be a CBF candidate user by default, and an item indicating whether a pre-scheduling user is a CBF candidate user does not need to be added. Therefore, content of the user measurement set is reduced, and content of information subsequently exchanged between cells is correspondingly simplified.

In step 2022, the first base station receives pre-scheduling information sent by a third base station to which a third cell belongs, where the pre-scheduling information includes a user measurement set of a third pre-scheduling user.

The third pre-scheduling user is a pre-scheduling user at the second moment that is determined by the third base station at the first moment, and the user measurement set of the third pre-scheduling user is used to record an interference source neighboring cell that interferes with the third pre-scheduling user and a degree of interference of RSRP of the interference source neighboring cell to the third pre-scheduling user. The third cell is a cell that is in the neighboring cell of the first cell and that is interfered with by the first cell or all neighboring cells of the first cell.

In this embodiment each base station in the data transmission system performs pre-scheduling for a user in a cell managed by the base station. The third cell serves as a neighboring cell of the first cell, and therefore the base station corresponding to the third cell also performs pre-scheduling. For example, at the first moment, the third base station determines the third pre-scheduling user at the second moment from a user in the third cell. For this process, refer to step 201. Details are not described in this embodiment.

After determining the third pre-scheduling user, the third base station may obtain the user measurement set of the third pre-scheduling user. For a process of obtaining the user measurement set, refer to step 2021. This is not limited in this embodiment.

In this embodiment there are at least two cases in which a user measurement set is exchanged between neighboring cells. In one case, an interfered cell transmits a user measurement set of a pre-scheduling user in the cell to an interference source cell; and in this case, the pre-scheduling user in the interfered user is the foregoing CBF candidate user. In the other case, a user measurement set is exchanged between any two neighboring cells.

Correspondingly, the third cell may be a general term of a type of cell. The third cell may be a cell that is in the neighboring cell of the first cell and that is interfered with by the first cell, or may be all the neighboring cells of the first cell.

After obtaining the user measurement set of the third pre-scheduling user, the third base station sends the user measurement set of the third pre-scheduling user to the first base station, so that the first base station determines, based on the user measurement set of the first pre-scheduling user and the user measurement set of the third pre-scheduling user, whether the third pre-scheduling user is a CBF to-be-adjusted user.

For example, in the foregoing second case, it is assumed that both a user 19 in a cell 3 and a user 39 in a cell 5 are interfered with by the cell 1. In this case, both the cell 3 and the cell 5 belong to the third base station. For the user measurement set of the third pre-scheduling user that is sent by the third base station, refer to Table 3 and Table 4.

TABLE 3

| Cell number | UE identifier | Primary interference cell | Secondary interference cell |
|---|---|---|---|
| 3 | 19 | Cell 1, 63% | Cell 7, 26% |

TABLE 4

| Cell number | UE identifier | Primary interference cell | Secondary interference cell |
|---|---|---|---|
| 5 | 39 | Cell 8, 43% | Cell 1, 40% |

Likewise, when the first pre-scheduling user is a CBF candidate user, the first cell is an interfered cell. In the foregoing first case, the first base station may send, by using pre-scheduling information, the user measurement set of the first pre-scheduling user to a base station to which all the neighboring cells belong, namely, the third base station. In the foregoing second case, the first base station may send, by using pre-scheduling information, the user measurement set of the first pre-scheduling user to a base station to which the interference source cell of the first pre-scheduling user belongs. For example, referring to Table 1, if interference neighboring cells of the first pre-scheduling user are the cell 2 and the cell 3, the first base station sends the user measurement set of the first pre-scheduling user to a base station to which the cell 2 and the cell 3 belong. For an action of the first base station, refer to that of the third base station. Details are not described in this embodiment.

In step 2023, the first base station determines, based on the user measurement set of the first pre-scheduling user and the user measurement set of the third pre-scheduling user, whether the first pre-scheduling user is a CBF to-be-adjusted user.

In this embodiment, the first base station may establish an overall user measurement set based on the user measurement set of the first pre-scheduling user and the user measurement set of the third pre-scheduling user. The overall user measurement set is used to record an interference source neighboring cell that interferes with a target pre-scheduling user and a degree of interference of RSRP of the interference source neighboring cell to the target pre-scheduling user.

It can be understood from the first case in step 2022 that target pre-scheduling users may be users in the first cell and users in all neighboring cells interfered with by the first cell. It can be understood from the second case in step 2022 that target pre-scheduling users may be users in the first cell and users in all the neighboring cells of the first cell.

For example, it can be understood from the first case in step 2022 that it is assumed that the overall user measurement set may be shown in Table 5. It can be noted that content in the remarks item in Table 5 is used to explain each user measurement set. In an application, the overall user measurement set may not carry the remarks item. Further, the overall user measurement set may include an item indicating whether a pre-scheduling user is a CBF candidate user. Correspondingly, for content in each row of the user measurement set, refer to Table 2. In this case, the first base station may determine, based on content in the item that is in the overall user measurement set and that indicates whether a pre-scheduling user is a CBF candidate user, a cell in which a pre-scheduling user is a CBF candidate user; in other words, determine a cell that is in the neighboring cell of the first cell and that is interfered with by the first cell. In an application, the first cell may have a number of neighboring cells. In this embodiment, an example in which the first cell has only four neighboring cells is used for description in Table 5. For example, Table 5 records a user measurement set of pre-scheduling users in five cells.

TABLE 5

| Cell number | UE identifier | Primary interference cell | Secondary interference cell | Remarks |
| --- | --- | --- | --- | --- |
| 1 | 3 | Cell 3, 40% | Cell 2, 30% | The user 3 is interfered with by two interference cells: the cell 3 and the cell 2; and a sum of interference of the two interference cells exceeds a signal to interference plus noise ratio. |
| 2 | 10 | Cell 4, 85% | — | The interference of the primary interference cell 4 to the user 10 exceeds the signal to interference plus noise ratio. |
| 3 | 19 | Cell 1, 63% | Cell 7, 26% | |
| 4 | 30 | Cell 5, 57% | Cell 3, 41% | |
| 5 | 39 | Cell 8, 43% | Cell 1, 40% | |

For example, it can be understood from the second case in step 2022 that it is assumed that the overall user measurement set may be shown in Table 6. It can be noted that content in the remarks item in Table 6 is used to explain each user measurement set. In an application, the overall user measurement set may not carry the remarks item. Further, the overall user measurement set may include an item indicating whether a pre-scheduling user is a CBF candidate user. Correspondingly, for content in each row of the user measurement set, refer to Table 2. In an application, the first cell may interfere with a number of neighboring cells. In this embodiment, an example in which only two neighboring cells are interfered with by the first cell is used for description in Table 6. For example, Table 6 records a user measurement set of pre-scheduling users in three cells.

TABLE 6

| Cell number | UE identifier | Primary interference cell | Secondary interference cell | Remarks |
| --- | --- | --- | --- | --- |
| 1 | 3 | Cell 3, 40% | Cell 2, 30% | The user 3 is interfered with by two interference cells: the cell 3 and the cell 2; and a sum of interference of the two interference cells exceeds a signal to interference plus noise ratio. |
| 3 | 19 | Cell 1, 63% | Cell 7, 26% | |
| 5 | 39 | Cell 8, 43% | Cell 1, 40% | |

It can be understood from step 2022, step 2023, Table 5, and Table 6 that in the manner that is of transmitting a user measurement set and that is provided in the second case, a quantity of transmission times of the user measurement set can be reduced, thereby reducing complexity of establishing the overall user measurement set. Therefore, in an application, the manner that is of transmitting a user measurement set and that is provided in the second case is usually used.

Further, the first base station may determine, based on the overall user measurement set, whether the first pre-scheduling user is a CBF to-be-adjusted user.

For example, the first base station queries, based on the cell number of the first cell, whether the first cell exists in the overall user measurement set as an interference source cell (may query the primary interference cell and the secondary interference cell in Table 5 or Table 6), and determines that the first pre-scheduling user in the first cell is not a CBF to-be-adjusted user if the first cell does not exist in the overall user measurement set as an interference source cell, or determines that the first pre-scheduling user in the first cell is a CBF to-be-adjusted user if the first cell exists in the overall user measurement set as an interference source cell.

It can be noted that the pre-scheduling information may be exchanged through a backhaul line. The backhaul line is also referred to as a backhaul link, and refers to a connection from an access network or a cell site to a switching center. The switching center is connected to a backbone network, and the backbone network is connected to a core network. Therefore, the backhaul line is an intermediate layer in any telecommunications network structure. The backhaul line is located between the access network and the backbone network, and provides an important connection for the two networks.

In step 203, the first base station determines a first transmit weight obtained after CBF weight adjustment, and performs step 205.

It can be noted that in step 2022, the pre-scheduling information sent by the third base station may further include CSI of the third pre-scheduling user. The CSI may include information such as quantities of rows and columns of a precoding matrix indicator (PMI), a CQI, and a quantity of streams (which is equal to a rank of the precoding matrix).

Correspondingly, a process of determining the first transmit weight of the first cell may include:

In step X1: Obtain CSI of a CBF coordinated user from the CSI of the third pre-scheduling user when the first pre-scheduling user is a CBF to-be-adjusted user.

When the first pre-scheduling user is a CBF to-be-adjusted user, it indicates that a transmit weight of the first cell at the second moment needs to be adjusted; in other words, the CBF weight adjustment is to be performed. The CBF weight adjustment requires determining of the CBF coordinated user of the first cell, and the CBF weight adjustment can be implemented only through coordination with the CBF coordinated user. The CBF coordinated user of the first cell is a user that is interfered with by the first cell and that meets a preset filtering condition. The preset filtering condition is n0 users with a highest degree of interference; in other words, the CBF coordinated user is the first n users that are most severely interfered with by the first cell in the third pre-scheduling user and that are determined by the first base station, and n0 is a threshold of a quantity of users that can be coordinated in the first cell. In an application, n0=n1−n2, where n1 is a threshold n1 of a quantity of users that may be coordinated users of the first cell, and is equal to a quantity of transmit antennas in the first cell, and n2 is a quantity of streams served by the first cell at the second moment, and is equal to a quantity of receive antennas of the first pre-scheduling user.

The first base station may determine the CBF coordinated user of the first cell based on the overall user measurement set provided in step 202. For example, a process of determining the CBF coordinated user of the first cell may include: the (n1−n2) users with the highest degree of interference are selected from the overall user measurement set as the CBF coordinated user of the first cell based on the threshold n1 of the quantity of users that may be coordinated users of the first cell and the quantity n2 of streams served by the first cell at the second moment. The degree of interference is positively correlated with an interference ratio; in other words, a higher ratio of interference of the first cell to an interfered user indicates a higher degree of interference to the interfered user.

For example, it is assumed that n1=4 and n2=1, and therefore n0=3. If the first cell interferes with more than three users, in Table 5 or Table 6, the first three users for which scheduling is to be performed and that have a highest ratio of interference of the first cell to the interfered user are selected as the CBF coordinated users of the first cell; in other words, the first base station can adjust a transmit weight of a downlink signal at the second moment only for three CBF coordinated users, so as to reduce impact of the downlink signal on the three CBF coordinated users.

If the first cell interferes with no more than three users, each user interfered with by the first cell is determined as the CBF coordinated user of the first cell. Referring to Table 5 or Table 6, the first cell (namely, cell 1) interferes with both the user 19 (the corresponding ratio of interference of cell 1 to the user 19 is 63%) and the user 39 (the corresponding ratio of interference of cell 1 to the user 39 is 40%), and therefore the pre-scheduling users 19 and 39 are selected as the CBF coordinated users.

It can be noted that the first base station m may further establish a CoMP coordinated user set $U_m$, where $U_m$ includes a pre-scheduling user of the first cell and the CBF coordinated user of the first cell. For example, if the first cell m includes pre-scheduling users $a_1, \ldots a_{N_1} \in S_m$ ($N_1$ is a quantity of first pre-scheduling users in the first cell at the second moment, and $N_1>1$ if there are a number of first pre-scheduling users, or $N_1=1$ if there is one first pre-scheduling user), and the first cell includes CBF coordinated users $\{b_1, \ldots, b_{N_2}\}$, where $N_2$ is a quantity of CBF coordinated users of the first cell, and $U_m = \{a_1, \ldots, a_{N_1}, b_1, \ldots, b_{N_2}\}$ is the CoMP coordinated user set.

In step X2, determine the first transmit weight of the first cell based on CSI of the first pre-scheduling user and the CSI of the CBF coordinated user by using EZF, REZF, or a maximum SLNR.

Commonly used CBF weight adjustment algorithms include the EZF, the REZF, the SLNR, and the like. In this embodiment the following several implementable manners are used for description.

In a first implementable manner, a joint channel matrix of the first cell at the second moment is determined by using the EZF based on the CSI of the first pre-scheduling user and CSI of a second pre-scheduling user, and the first transmit weight of the first cell is determined based on the joint channel matrix.

A principle of the EZF algorithm is as follows: For the pre-scheduling users $a_1, \ldots a_{N_1} \in S_m$ in the first cell m ($N_1$ is a quantity of first pre-scheduling users in the first cell at the second moment, and $N_1>1$ if there are a number of first pre-scheduling users, or $N_1=1$ if there is one first pre-scheduling user), signals sent to the first pre-scheduling users $\{a_1, \ldots, a_{N_1}\}$ are orthogonal to channel feature directions of the CBF coordinated users $\{b_1, \ldots, b_{N_2}\}$ (namely, second pre-scheduling users) in the first cell.

CSI is exchanged between cells, so that PMIs of channels from the first base station to the first pre-scheduling user and from the first base station to the second pre-scheduling user can be obtained. Eigenvectors corresponding to the PMIs are used to reconstruct a downlink channel, and are used to calculate a CBF weight. It is assumed that input parameters are eigenvectors $\{V_u | u \in U_m\}$ of all the pre-scheduling users. A constructed EZF joint channel matrix is as follows:

$$H = \begin{bmatrix} V_{a1}^H \\ \ldots \\ V_{aN1}^H \\ V_{b1}^H \\ \ldots \\ V_{bN2}^H \end{bmatrix}.$$

In this case, a weight matrix of paired users in the first cell m is as follows:

$$W = H^{H*}(H*H^H)^{-1}*\text{diag}(\beta)$$

For example, $W=[\psi_{a_1} \ldots \psi_{a_{N1}} \psi_{b_1} \ldots \psi_{b_{N2}}]$. It can be noted that an actually used weight matrix $W_{use}$ meets the following condition:

$$W_{use} = \frac{1}{\sqrt{N_1}} W = [w_{a_1} \ldots w_{a_{N_1}} \; w_{b_1} \ldots w_{b_{N_2}}],$$

where $\psi_{a_1}$ to $\Psi_{a_{N1}}$ and $\Psi_{b_1}$ to $\Psi_{b_{N1}}$ are column vectors of T×1, and modulus values are normalized; $\psi_{a_1}$ to $\Psi_{a_{N1}}$ and $\Psi_{b_1}$ to $\Psi_{b_{N1}}$ are column vectors of T×1, and modulus values are normalized to $1/\sqrt{N_1}$. $N_1$ is the quantity of first pre-scheduling users in the first cell at the second moment; when $N_1>1$, $1/\sqrt{N_1}$ is a value used to ensure that total power is normalized; T is the quantity of transmit antennas in the first cell m; "H" on an upper-right corner represents calculating a conjugate transpose matrix; "−1" on the upper-right corner represents calculating an inverse matrix; and diag(β) is a diagonal matrix used to normalize a matrix, and may be considered as a normalization factor of the column vectors. For example, it is assumed that the first cell is an 8T cell; in other words, T=8, and there are eight transmit antennas. In this case, $w_{a1}$ is a column vector of 8×1.

It is assumed that quantities of streams of all the first pre-scheduling users in the first cell are respectively $\{L_1, L_2, \ldots, L_{N_1}\}$, and a total quantity of streams is L. In this case, a quantity of transmit streams required by the first cell, namely, a spatial dimension, is calculated. Correspondingly, the required quantity is selected from $W_{use}$. In a CBF solution, only the first L column vectors are selected from $W_{use}$ as weight vectors for transmitting signals to the first pre-scheduling users in the first cell; in other words, the first L column vectors are selected from $W_{use}$ as the first transmit weights of the first cell.

In a second implementable manner, a joint channel matrix of the first cell at the second moment is determined by using the REZF based on the CSI of the first pre-scheduling user and CSI of a second pre-scheduling user, and the first transmit weight of the first cell is determined based on the joint channel matrix.

The REZF algorithm is intended to strike a balance between a valid signal and interference avoidance to obtain a compromised joint channel matrix W. Different from the EZF, the formula is modified as follows:

$$W=H^{H}*(H*H^{H}+\text{diag}(\alpha))^{-1}*\text{diag}(\beta).$$

For example, $W=[\psi_{a_1} \ldots \psi_{a_{N1}} \psi_{b_1} \ldots \psi_{b_{N2}}]$. It can be noted that an actually used weight matrix $W_{use}$ meets the following condition:

$$W_{use} = \frac{1}{\sqrt{N_1}} W = [w_{a_1} \ldots w_{a_{N_1}} \; w_{b_1} \ldots w_{b_{N_2}}],$$

where $\psi_{a_1}$ to $\Psi_{a_{N1}}$ and $\Psi_{b_1}$ to $\Psi_{b_{N1}}$ are column vectors of T×1, and modulus values are normalized; $\psi_{a_1}$ to $\Psi_{a_{N1}}$ and $\Psi_{b_1}$ to $\Psi_{b_{N1}}$ are column vectors of T×1, and modulus values are normalized to $1/\sqrt{N_1}$; T is the quantity of transmit antennas in the first cell; $N_1$ is the quantity of first pre-scheduling users in the first cell at the second moment; when $N_1>1$, $1/\sqrt{N_1}$ is a value used to ensure that total power is normalized; T is the quantity of transmit antennas in the first cell m; "H" on an upper-right corner represents calculating a conjugate transpose matrix; "−1" on the upper-right corner represents calculating an inverse matrix; diag(α) is a diagonal matrix; a dimension of diag(α) is a total quantity of layers of H; a rank of diag(α) is L; an element of diag(α) is $$\alpha_v = \frac{1}{SINR_v};$$

the multiplied diagonal matrix diag(β) on the right is used to normalize each column of power in a cell weight matrix; and a $v^{th}$ element in a diagonal line of diag(β) is a reciprocal of a modulo of a vector in a $v^{th}$ column of the matrix $H(k)^{H}*$ $(H(k)*H(k)^{H}+\text{diag}(\alpha))^{-1}$. It is assumed that quantities of streams of all the first pre-scheduling users in the first cell are respectively $\{L_1, L_2, \ldots, L_{N_1}\}$, and a total quantity of streams is L. In this case, a quantity of transmit streams required by the first cell, namely, a spatial dimension, is calculated. Correspondingly, the required quantity is selected from $W_{use}$. In a CBF solution, only the first L column vectors are selected from $W_{use}$ as weight vectors for transmitting signals to the first pre-scheduling users in the first cell; in other words, the first L column vectors are selected from $W_{use}$ as the first transmit weights of the first cell.

In a third implementable manner, a joint channel matrix of the first cell at the second moment is determined by using the SLNR based on the CSI of the first pre-scheduling user and CSI of a second pre-scheduling user, and the first transmit weight of the first cell is determined based on the joint channel matrix.

A principle of the SLNR algorithms is as follows: For the first pre-scheduling users $a_1, \ldots a_{N_1} \in S_m$ in the first cell m ($N_1$ is a quantity of first pre-scheduling users in the first cell at the second moment, and $N_1>1$ if there are a number of first pre-scheduling users, or $N_1=1$ if there is one first pre-scheduling user), a ratio of signal received power of the first pre-scheduling users to interference plus leakage power of the CBF coordinated users $\{b_1, \ldots, b_{N_2}\}$ in the first cell is maximized. For example, a weight generation constraint condition is to maximize a ratio of signal power to signal power and noise leaked to a cell in which the CBF coordinated user in the first cell is located, so that a weight can be used to resolve both a problem of leakage to the cell in which the CBF coordinated user in the first cell is located and a problem of a signal-to-noise ratio of the first pre-scheduling user.

Correspondingly, a maximum SLNR weight is an eigenvector W corresponding to a maximum eigenvalue of the following matrix $VDV^{-1}$:

$$VDV^{-1} = \left(N_R * \sigma_{a_v}^2 * I + \left(\sum_{\substack{u \in U_m \\ u \neq a_v}} P_u * R_u\right)\right)^{-1} * R_{a_v}.$$

For example, $W=[\psi_{a_1} \ldots \psi_{a_{N1}} \psi_{b_1} \ldots \psi_{b_{N2}}]$. It can be noted that an actually used weight matrix $W_{use}$ meets the following condition:

$$W_{use} = \frac{1}{\sqrt{N_1}} W = [w_{a_1} \ldots w_{a_{N_1}} \; w_{b_1} \ldots w_{b_{N_2}}],$$

where $\psi_{a_1}$ to $\Psi_{a_{N1}}$ and $\Psi_{b_1}$ to $\Psi_{b_{N1}}$ are column vectors of T×1, and modulus values are normalized; $\psi_{a_1}$ to $\Psi_{a_{N1}}$ and $\Psi_{b_1}$ to $\Psi_{b_{N1}}$ are column vectors of T×1, and modulus values are normalized to $1/\sqrt{N_1}$; T is the quantity of transmit antennas in the first cell; $N_1$ is the quantity of first pre-scheduling users in the first cell at the second moment; when $N_1>1$, $1/\sqrt{N_1}$ is a value used to ensure that total power is normalized; T is the quantity of transmit antennas in the first cell m; $N_R*\sigma_{a_v}^2$ is total received noise power of the first pre-scheduling user $a_v$ before CBF; $1 \leq v \leq N1$; $N_R$ is a quantity of receive antennas of the first pre-scheduling user $a_v$; $\sigma_{a_v}^2$, is average noise power of each receive antenna of the first pre-scheduling user $a_v$; $P_{a_v}$ is transmit power of the first cell for each stream of the first pre-scheduling user a (in other words, P is average transmit power of each stream of the first pre-scheduling user $a_v$); $R_{a_v}$ a matrix related to a channel from the first cell to the first pre-scheduling user $a_v$; $R_u$ is a matrix related to a channel from the first cell to the CBF coordinated users $\{b_1, \ldots, b_{N_2}\}$ in the first cell; $L_{a_v}$ represents a rank of the user $a_v$, and the rank is equal to 1 herein; and t is the quantity of transmit antennas in the first cell in the first base station. In this case, $w_{av}$ is a column of vectors corresponding to $L_{a_v}$ maximum eigenvalues in the matrix V.

It is assumed that quantities of streams of all the first pre-scheduling users in the first cell are respectively $\{L_1, L_2, \ldots, L_{N_1}\}$, and a total quantity of streams is L. In this case, a quantity of transmit streams required by the first cell, namely, a spatial dimension, is calculated. Correspondingly, the required quantity is selected from $W_{use}$. In a CBF solution, only the first L column vectors are selected from $W_{use}$ as weight vectors for transmitting signals to the first pre-scheduling users in the first cell; in other words, the first L column vectors are selected from $w_{use}$ as the first transmit weights of the first cell.

In this embodiment the CBF weight adjustment is relative to a conventional transmit weight. For a process of determining the conventional transmit weight, refer to a subsequent determining method in step 204.

In step 204, the first base station determines a first transmit weight of the first cell at the second moment by using a conventional technology, and performs step 205.

In an application, the first base station may first calculate the first transmit weight of the first cell at the second moment by using the conventional technology, for example, calculate the first transmit weight of the first cell at the second moment according to content in the standard 3GPP 36.211 to 3GPP 36.213. The first transmit weight is obtained through calculation based on a CQI reported by the first pre-scheduling user. The first transmit weight is usually obtained through calculation in a first pre-scheduling process corresponding to step 201.

In step 205, the first base station receives a second transmit weight at the second moment that is sent by a second base station to which a second cell belongs in the data transmission system.

In this embodiment each base station determines a transmit weight of a cell at the second moment that is managed by the base station. For a manner of determining the transmit weight, refer to step 203 or step 204. Details are not described in this embodiment.

In addition, each base station sends the transmit weight obtained through calculation to an associated neighboring cell. For example, the first base station receives the second transmit weight at the second moment that is sent by the second base station to which the second cell belongs in the data transmission system. In this embodiment the second cell is an associated neighboring cell of the first cell, and the second cell includes a neighboring cell that meets a preset interaction condition and that is in the neighboring cell of the first cell. The preset interaction condition is defined based on a specific transmission scenario.

The neighboring cell that meets the preset interaction condition and that is in the neighboring cell of the first cell may be a base station to which the first base station sends a user measurement set within preset duration; in other words, the second base station is a base station to which the first base station sends the user measurement set within the preset duration. The preset duration is greater than or equal to a time interval between the first moment and the second moment. Optionally, the preset duration may be eight timeslots. In this scenario, the first base station receives a transmit weight sent by a base station to which the first base station previously sends the user measurement set of the first pre-scheduling user; in other words, each of base stations that are determined by the first base station and to which interference source cells that previously interfere with or are currently interfering with the first pre-scheduling user belong feeds back a transmit weight of the base station at the second moment to the first base station.

Correspondingly, after determining the first transmit weight of the first cell at the second moment, the first base station may send the first transmit weight to a base station to which an associated neighboring cell belongs. The base station to which the associated neighboring cell belongs is a base station that sends a user measurement set to the first base station within the preset duration.

For example, when the first pre-scheduling user is a CBF to-be-adjusted user, the first transmit weight is sent to the base station to which the associated neighboring cell belongs, and the first transmit weight is a weight obtained after the CBF weight adjustment, namely, the first weight determined in step 203.

When the first pre-scheduling user is not a CBF to-be-adjusted user, the first transmit weight is sent to the base station to which the associated neighboring cell belongs, and the first transmit weight is a weight on which no CBF weight adjustment is performed, namely, the first weight determined in step 204.

Alternatively, the neighboring cell that meets the preset interaction condition and that is in the neighboring cell of the first cell may be all the neighboring cells of the first cell; in other words, the second cell is all the neighboring cells of the first cell. In this scenario, the first base station receives transmit weights sent by base stations to which all neighboring cells of the first base station belong; in other words, all the base stations to which the neighboring cells of the first base station belong feed back the transmit weights of the base stations at the second moment to the first base station.

Correspondingly, after determining the first transmit weight of the first cell at the second moment, the first base station may send the first transmit weight to the base stations to which all the neighboring cells of the first cell belong. In this scenario, because the second cell is all the neighboring cells of the first cell, the first base station may send the first transmit weight to the second base station.

For example, when the first pre-scheduling user is not a CBF to-be-adjusted user, the first transmit weight is sent to the second base station, and the first transmit weight is a weight on which no CBF weight adjustment is performed, namely, the first weight determined in step 204.

When the first pre-scheduling user is a CBF to-be-adjusted user, the first transmit weight is sent to the second base station, and the first transmit weight is a weight obtained after the CBF weight adjustment, namely, the first weight determined in step 203.

In step 206, the first base station calculates a signal to interference plus noise ratio (SINR) of each user in the first cell based on the first transmit weight and the second transmit weight.

It can be noted that when the data transmission system is a TDD system or an FDD system, an SINR of a first user is calculated using a different method. In this embodiment, the following two implementable manners are used as examples for description.

In a first implementable manner, when the data transmission system is a TDD system, a process of calculating the signal to interference plus noise ratio SINR of each user in the first cell at the second moment based on the first transmit weight and the second transmit weight includes:

calculating an SINR of a first user k at the second moment by using a first signal-to-noise ratio calculation formula based on the first transmit weight and the second transmit weight, where the first signal-to-noise ratio calculation formula is as follows:

$$SINR_{k,l} = \frac{|H_{i,k} * w_{i,l}|^2}{noise + \sum_{y=1}^{Y} \sum_{f=1}^{F_y} |H_{y,k} * w_{y,f}|^2},$$

where the first user k is any user in the first cell at the second moment; $SINR_{k,l}$ represents an SINR of an $l^{th}$ stream of the first user k at the second moment; $H_{i,k}$ represents a channel from the first base station i to the first user k; y represents a target neighboring cell of the first user k, and the target neighboring cell is one of neighboring cells that can be measured by the first user k in the second cell, namely, a neighboring cell that can be measured by the first user k and that is in cells that send a weight to the first cell; $H_{y,k}$ represents a channel from the neighboring cell y to the first user k; "noise" represents a noise floor of the first user; Y represents a total quantity of neighboring cells that can be measured by the first user k in the second cell; $w_{y,f}$ represents a transmit weight of an $f^{th}$ stream of the target neighboring cell y at the second moment; and Fy represents a total quantity of transmit streams of the target neighboring cell y at the second moment.

It can be understood from the foregoing description that in the TDD system, an SINR of any user in the cell is positively correlated with a product of a channel of the user and a transmit weight, and is negatively correlated with a product of a channel of a neighboring cell that can be measured by the user and a transmit weight. An SINR obtained through calculation by using the first signal-to-noise ratio calculation formula is more accurate than an SINR determined based on a CQI reported by a user.

In a second implementable manner, when the data transmission system is an FDD system, a process of calculating the signal to interference plus noise ratio SINR of each user in the first cell at the second moment based on the first transmit weight and the second transmit weight includes:

calculating an SINR of a first user k at the second moment by using a second signal-to-noise ratio calculation formula based on the first transmit weight and the second transmit weight, where the second signal-to-noise ratio calculation formula is as follows:

$$SINR_{k,l} = \frac{RSRP_{k,i} * |w_{k,SU,l}^H * w_{k,CBF,l}|^2}{noise + \sum_{y=1}^{Y} \sum_{f=1}^{F_y} |\sqrt{RSRP_{k,y}} * w_{k,y}^H * w_{y,f}|^2},$$

where the first user k is any user in the first cell at the second moment; $SINR_{k,l}$ represents an SINR of an $l^{th}$ stream of the first user k at the second moment; $RSRP_{k,i}$ represents an SINR measured by the first user k at the second moment from the first cell i to the first user; H represents calculating a conjugate transpose matrix; y represents a target neighboring cell of the first user k, and the target neighboring cell is one of neighboring cells that can be measured by the first user k in the second cell; $RSRP_{k,y}$ represents RSRP measured by the first user k at the second moment from the target neighboring cell y to the first user k; Y represents a total quantity of neighboring cells that can be measured by the first user k in the second cell; Fy represents a total quantity of transmit streams of the target neighboring cell y at the second moment; $w_{y,f}$ represents a transmit weight of an $f^{th}$ stream of the target neighboring cell y at the second moment; $w_{k,y}$ is used to represent a channel from the target neighboring cell y to the first user k; and a dimension of $w_{k,y}$ is the same as a dimension of $w_{y,f}$; and when CBF weight adjustment is performed on the first cell between the first moment and the second moment, $W_{k,SU,l}$ represents a transmit weight of the $l^{th}$ stream of the first user k before the CBF weight adjustment; in other words, the transmit weight is the first transmit weight determined in step 204, and $w_{k,CBF,l}$ represents a transmit weight of the $l^{th}$ stream of the first user k after the CBF weight adjustment; in other words, the transmit weight is the first transmit weight determined in step 203; or when coordinated beamforming CBF weight adjustment is not performed on the first cell between the first moment and the second moment, $w_{k,SU,l}$ is equal to $w_{k,CBF,l}$ and represents a transmit weight of the $l^{th}$ stream of the first user k at the second moment; in other words, the transmit weight is the first transmit weight determined in step 204, where in this case, the second signal-to-noise ratio calculation formula may be adjusted as follows:

$$SINR_{k,l} = \frac{RSRP_{k,i} * |w_{k,SU,l}^H * w_{k,SU,l}|^2}{noise + \sum_{y=1}^{Y} \sum_{f=1}^{F_y} |\sqrt{RSRP_{k,y}} * w_{k,y}^H * w_{y,f}|^2}.$$

It can be noted that the dimension of $w_{k,y}$ may be represented by quantities of rows and columns of a precoding matrix corresponding to a PMI that is measured by the first user k based on information that a quantity of streams of the first user k is 1 and that is reported to the first base station.

It can be understood from the foregoing description that in the FDD system, an SINR of any user in the cell is positively correlated with a product of a channel of the user and a transmit weight and RSRP of the user, and is negatively correlated with a product of a channel of a neighboring cell that can be measured by the user and a transmit weight and RSRP of the neighboring cell that can be measured by the user. An SINR obtained through calculation by using the second signal-to-noise ratio calculation formula is more accurate than an SINR determined based on a CQI reported by a user.

In step 207, the first base station selects a target scheduling user at the second moment from the user in the first cell based on the signal to interference plus noise ratio (SINR) of each user at the second moment.

As shown in FIG. 2-3, the selecting a target scheduling user at the second moment from the user in the first cell based on the SINR of each user at the second moment includes the following steps:

In step 2071, the first base station determines an MCS of each user at the second moment based on the SINR of each user at the second moment.

In this embodiment, the MCS may be obtained by querying a preset table in the 3GPP protocol based on the SINR. Details are not described in this embodiment.

In step 2072, the first base station determines spectrum efficiency of each user at the second moment based on the MCS of each user at the second moment.

In this embodiment, the spectrum efficiency of each user at the second moment may be determined by querying a table based on the MCS of each user at the second moment.

In step 2073, the first base station selects the target scheduling user at the second moment from the first cell based on the spectrum efficiency of each user at the second moment according to a proportional fair principle.

Referring to the proportional fair algorithm in step 201, in step 2073, except that the method for determining the spectrum efficiency of each user at the second moment is different from the method provided in step 201, a method for determining another parameter is the same as that provided in the proportional fair algorithm.

For example, it is assumed that there is a transmission subframe f at the second moment. A user p that meets the proportional fair principle may meet the following proportional fair formula:

$$p = \underset{k=1,2,\ldots,K}{\mathrm{argmax}} \frac{E_k(f)}{T_k(f-1)},$$

where $E_k(f)$ is spectrum efficiency of a spectrum resource to be scheduled for a user k in the subframe f, and is obtained by performing step 2071, where $1 \leq k \leq K$, and K is a total quantity of users in a cell; $T_k(f)$ is a total amount of data transmitted by the user k before the subframe f; and $$\underset{k=1,2,\ldots,K}{\mathrm{argmax}}$$

represents obtaining a maximum value from ratios of a user 1 to a user K. For a process of obtaining $T_k(f-1)$ of the user k, refer to step 201. Details are not described in this embodiment.

A user k with a largest ratio of $E_k(f)$ to $T_k(f-1)$ is the target scheduling user at the second moment. The target scheduling user is a user with a highest priority that best meets the first transmit weight and the second transmit weight at the second moment.

In step 208: At the second moment, the first base station transmits data to the target scheduling user by using an MCS of the target scheduling user.

Referring to step 2071 in step 207, the MCS of the target scheduling user is determined in step 2071. Therefore, the MCS of the target scheduling user may be directly obtained, and at the second moment, data is transmitted to the target scheduling user by using the MCS of the target scheduling user. In this case, a used transmit weight is the first transmit weight obtained through calculation in step 203, and a transmit weight used by the second base station is the second transmit weight sent by the second base station in step 205.

It can be noted that after step 204, when the user is not a CBF to-be-adjusted user, the first base station may also transmit data to the target scheduling user at the second moment according to the proportional fair principle, in other words, transmit data to the target scheduling user at the second moment by using an MCS obtained through calculation by using the proportional fair algorithm provided in step 201. In this case, a used transmit weight is the first transmit weight obtained through calculation in step 204, and a transmit weight used by the second base station is the second transmit weight sent by the second base station in step 205.

In conclusion, in this embodiment, after determining the first pre-scheduling user at the second moment from the user in the first cell at the first moment, the first base station finds, without adjusting transmit weights of the first cell and an associated neighboring cell of the first cell, a user with a highest priority that best meets the transmit weight at the second moment, and selects the user as the target scheduling user, so as to avoid a case in which the transmit weight is invalid in actual scheduling, thereby improving interference avoidance reliability.

Further, according to the method for determining a scheduling user provided in this embodiment, the neighboring cell may be an inter-station neighboring cell, or may be an intra-station neighboring cell, and a case in which a transmit weight is invalid in actual scheduling can be effectively avoided particularly in a scenario in which an interaction delay between inter-station neighboring cells is relatively high. In addition, in this embodiment, scheduling is performed twice, for example, the first pre-scheduling process provided in step 201 and the second pre-scheduling process provided in step 207, so that in the data transmission system, overall coordinated interference management can be performed, and a scheduling process is combined with coordination, thereby overcoming a disadvantage that scheduling and coordination are previously separated.

It can be noted that in this embodiment, the method for determining a scheduling user is mainly described by using the first base station as an example. In an application, in the data transmission system, each base station may perform, like the first base station, two pre-scheduling processes in a pre-scheduling period (namely, a time period from the first moment to the second moment), and base stations to which neighboring cells belong usually exchange information. For example, referring to FIG. 2-4, in this embodiment, interaction between a base station (BS) 01 and a BS 02 is used as an example for description. It is assumed that a cell 1 served by the BS 01 includes UE 011, and a cell 2 served by the BS 02 includes UE 021. The BS 01 and the BS 02 may broadcast channel state information-reference signals (CSI-RS). The UE 011 may return a CSI feedback on the CSI-RS from the BS 01, and the UE 021 may return a CSI feedback on the CSI-RS from the BS 02. The BS 01 and the BS 02 may perform a first pre-scheduling process. For details, refer to step 201. It is assumed that the first cell and the second cell are neighboring cells or interference cells of each other, and the two cells exchange pre-scheduling information. The pre-scheduling information includes a user measurement set and CSI. For details, refer to step 2022. The first base station and the second base station determine, based on the received pre-scheduling information, whether to perform CBF weight adjustment, and then determine transmit weights at the second moment based on a determining result. The first cell and the second cell are neighboring cells of each other, and the first cell and the second cell also exchange the user measurement set within the preset duration. Therefore, the two cells meet the relationship between associated neighboring cells that is defined in step 205. The transmit weight may be a weight obtained after the CBF weight adjustment. For details, refer to the weight determined in step 203. Alternatively, the transmit weight may be a weight on which no CBF weight adjustment is performed. For details, refer to the weight determined in step 204. The first base station and the second base station perform a second pre-scheduling process based on the received weights and the weights of the first base station and the second base station. For details, refer to step 207. It is assumed that after the second pre-scheduling process, a target scheduling user in the first cell is the UE 011, and a target scheduling user in the second cell is the UE 021. In this case, the BS 01 transmits the determined transmit weight to the UE 011 by using a user equipment-specific reference signal (UE-RS, which is also referred to as a DM-RS), and performs scheduling by using the transmit weight; and the BS 02 transmits the determined transmit weight to the UE 021 by using a UE-RS, and performs scheduling by using the transmit weight.

A purpose of the first pre-scheduling process is as follows: because there is a backhaul line delay in exchanging a scheduling result and CSI information of each cell in a distributed system, information cannot be exchanged within a time of a frame at an actual sending moment (namely, the second moment). Therefore, a pre-scheduling manner needs to be used to predict a scheduling user (which is referred to as a pre-scheduling user in this embodiment) at a future actual sending moment based on CSI information of each cell at a current moment (namely, the first moment), and the pre-scheduling result and the CSI information are exchanged between cells, and are used to design a coordinated weight for CBF.

A purpose of the second pre-scheduling process is as follows: at the actual sending moment, a service status of a user in a cell may change compared with that at a pre-scheduling moment (for this scenario, refer to the scenario in FIG. 1-4), and it cannot be ensured that the pre-scheduling result is still valid for the cell. However, in this embodiment, it is expected that a transmit weight of each cell is no longer changed (in this embodiment, regardless of whether the CBF weight adjustment is performed, the transmit weight of each cell is no longer adjusted after each cell exchanges the transmit weight), and consequently, interference management in the system is destroyed. Therefore, when the weight remains unchanged, a user that best matches a specified transmit weight (in other words, with a highest priority in a case of the weight) in the entire data transmission system is searched for by performing the second pre-scheduling process, and the user is selected as the target scheduling user. In this way, there are at least two advantages: (1) the designed transmit weight may be not more suitable for the original pre-scheduling user, and a more appropriate user is selected and becomes the target scheduling user; (2) the original pre-scheduling user may leave due to a network change or user movement, but a replacement (namely, the target scheduling user) is most similar to the pre-scheduling user; and (3) a new high-priority user is allowed to be selected without changing the transmit weight in the data transmission system and destroying a previous interference management design in the entire system.

It can be noted that a sequence of the steps of the method for determining a scheduling user provided in this embodiment may be properly adjusted, and a step may be added or removed based on a situation. Any variation readily figured out by a person skilled in the art within the technical scope disclosed in the present invention shall fall within the protection scope of embodiments here. Therefore, details are not described.

Another embodiment provides an apparatus for determining a scheduling user, and the apparatus is applied to a first base station in a data transmission system. The first base station includes at least two antennas, and the first base station manages a first cell. As shown in FIG. 3-1, the apparatus includes:

a first determining module 301, configured to determine a first pre-scheduling user at a second moment from a user in the first cell at a first moment, where the second moment is later than the first moment;

a second determining module 302, configured to determine a first transmit weight of the first cell at the second moment;

a first receiving module 303, configured to receive a second transmit weight at the second moment that is sent by a second base station to which a second cell belongs in the data transmission system, where the second cell includes a neighboring cell that meets a preset interaction condition and that is in a neighboring cell of the first cell;

a calculation module 304, configured to calculate a signal to interference plus noise ratio SINR of each user in the first cell at the second moment based on the first transmit weight and the second transmit weight; and a selection module 305, configured to select a target scheduling user at the second moment from the user in the first cell based on the SINR of each user at the second moment.

In conclusion, in this embodiment, after the first determining module determines the first pre-scheduling user at the second moment from the user in the first cell at the first moment, the selection module finds, without adjusting transmit weights of the first cell and an associated neighboring cell of the first cell, a user that best meets the transmit weight at the second moment, and selects the user as the target scheduling user, so as to avoid a case in which the transmit weight is invalid in actual scheduling, thereby improving interference avoidance reliability.

In a first implementable manner, the data transmission system is a time division duplex TDD system, and the calculation module 304 is configured to:

calculate an SINR of a first user k at the second moment by using a first signal-to-noise ratio calculation formula based on the first transmit weight and the second transmit weight, where the first signal-to-noise ratio calculation formula is as follows:

$$SINR_{k,l} = \frac{|H_{i,k} * w_{i,l}|^2}{noise + \sum_{y=1}^{Y} \sum_{f=1}^{F_y} |H_{y,k} * w_{y,f}|^2},$$

where the first user k is any user in the first cell at the second moment; $SINR_{k,l}$ represents an SINR of an $l^{th}$ stream of the first user k at the second moment; $H_{i,k}$ represents a channel from the first base station i to the first user k; y represents a target neighboring cell of the first user k, and the target neighboring cell is one of neighboring cells that can be measured by the first user k in the second cell; $H_{y,k}$ represents a channel from the neighboring cell y to the first user k; "noise" represents a noise floor of the first user; Y represents a total quantity of neighboring cells that can be measured by the first user k in the second cell; $w_{y,f}$ represents a transmit weight of an $f^{th}$ stream of the target neighboring cell y at the second moment; and Fy represents a total quantity of transmit streams of the target neighboring cell y at the second moment.

In a second implementable manner, the data transmission system is a frequency division duplex FDD system, and the calculation module 304 is configured to:

calculate an SINR of a first user k at the second moment by using a second signal-to-noise ratio calculation formula based on the first transmit weight and the second transmit weight, where the second signal-to-noise ratio calculation formula is as follows:

$$SINR_{k,l} = \frac{RSRP_{k,i} * |w_{k,SU,l}^H * w_{k,CBF,l}|^2}{noise + \sum_{y=1}^{Y}\sum_{f=1}^{F_y} |\sqrt{RSRP_{k,y}} * w_{k,y}^H * w_{y,f}|^2},$$

the first user k is any user in the first cell at the second moment; $SINR_{k,l}$ represents an SINR of an $l^{th}$ stream of the first user k at the second moment; $RSRP_{k,i}$ represents an SINR measured by the first user k at the second moment from the first cell i to the first user; H represents calculating a conjugate transpose matrix; y represents a target neighboring cell of the first user k; the target neighboring cell is one of neighboring cells that can be measured by the first user k in the second cell; $RSRP_{k,y}$ represents RSRP measured by the first user k at the second moment from the target neighboring cell y to the first user k; Y represents a total quantity of neighboring cells that can be measured by the first user k in the second cell; Fy represents a total quantity of transmit streams of the target neighboring cell y at the second moment; $w_{y,f}$ represents a transmit weight of an $f^{th}$ stream of the target neighboring cell y at the second moment; $w_{k,y}$ is used to represent a channel from the target neighboring cell y to the first user k; and a dimension of $w_{k,y}$ is the same as a dimension of $w_{y,f}$; the dimension of $w_{k,y}$ is represented by quantities of rows and columns of a precoding matrix corresponding to a PMI that is measured by the first user k based on information that a quantity of streams of the first user k is 1 and that is reported to the first base station; and when coordinated beamforming CBF weight adjustment is performed on the first cell between the first moment and the second moment, $w_{k,SU,l}$ represents a transmit weight of the $l^{th}$ stream of the first user k before the CBF weight adjustment, and $w_{k,CBF,l}$ represents a transmit weight of the $l^{th}$ stream of the first user k after the CBF weight adjustment; or when coordinated beamforming CBF weight adjustment is not performed on the first cell between the first moment and the second moment, $w_{k,SU,l}$ is equal to $w_{k,CBF,l}$ and represents a transmit weight of the $l^{th}$ stream of the first user k at the second moment.

Further, as shown in FIG. 3-2, the apparatus further includes:

an obtaining module 306, configured to obtain a user measurement set of the first pre-scheduling user after the first pre-scheduling user at the second moment is determined from the user in the first cell, where the user measurement set of the first pre-scheduling user is used to record an interference source neighboring cell that interferes with the first pre-scheduling user and a degree of interference of RSRP of the interference source neighboring cell to the first pre-scheduling user;

a second receiving module 307, configured to receive pre-scheduling information sent by a third base station to which a third cell belongs, where the pre-scheduling information includes a user measurement set of a third pre-scheduling user, the third pre-scheduling user is a pre-scheduling user at the second moment that is determined by the third base station at the first moment, the user measurement set of the third pre-scheduling user is used to record an interference source neighboring cell that interferes with the third pre-scheduling user and a degree of interference of RSRP of the interference source neighboring cell to the third pre-scheduling user, and the third cell is a cell that is in the neighboring cell of the first cell and that is interfered with by the first cell or all neighboring cells of the first cell; and a third determining module 308, configured to determine, based on the user measurement set of the first pre-scheduling user and the user measurement set of the third pre-scheduling user, whether the first pre-scheduling user is a CBF to-be-adjusted user.

The neighboring cell that meets the preset interaction condition and that is in the neighboring cell of the first cell is a base station to which the first base station sends a user measurement set within preset duration, and the preset duration is greater than or equal to a time interval between the first moment and the second moment; and as shown in FIG. 3-3, the apparatus further includes:

a sending module 309, configured to: after the first transmit weight of the first cell at the second moment is determined, send the first transmit weight to a base station to which an associated neighboring cell belongs, where the base station to which the associated neighboring cell belongs is a base station that sends a user measurement set to the first base station within the preset duration.

Alternatively, the neighboring cell that meets the preset interaction condition and that is in the neighboring cell of the first cell is all the neighboring cells of the first cell; and as shown in FIG. 3-3, the apparatus further includes:

a sending module 309, configured to send the first transmit weight to the second base station after the first transmit weight of the first cell at the second moment is determined.

Optionally, the selection module 305 is configured to:

determine a modulation and coding scheme MCS of each user at the second moment based on the SINR of each user at the second moment;

determine spectrum efficiency of each user at the second moment based on the MCS of each user at the second moment; and select the target scheduling user at the second moment from the first cell based on the spectrum efficiency of each user at the second moment according to a proportional fair principle.

Optionally, the pre-scheduling information further includes channel state information CSI of the third pre-scheduling user; and the second determining module 302 is configured to:

obtain CSI of a CBF coordinated user from the CSI of the third pre-scheduling user when the first pre-scheduling user is a CBF to-be-adjusted user, where the CBF coordinated user is the first n users that are most severely interfered with by the first cell in the third pre-scheduling user and that are determined by the first base station, and n is a threshold of a quantity of users that can be coordinated in the first cell; and determine the first transmit weight of the first cell based on CSI of the first pre-scheduling user and the CSI of the CBF coordinated user by using eigenvector zero forcing EZF, regularized eigenvector zero forcing REZF, or a maximum signal to leakage plus noise ratio SLNR.

In conclusion, in this embodiment, after the first determining module determines the first pre-scheduling user at the second moment from the user in the first cell at the first moment, the selection module finds, without adjusting transmit weights of the first cell and an associated neighboring cell of the first cell, a user with a highest priority that best meets the transmit weight at the second moment, and selects the user as the target scheduling user, so as to avoid a case in which the transmit weight is invalid in actual scheduling, thereby improving interference avoidance reliability.

Another embodiment further provides a data transmission system, including at least two base stations. The at least two base stations include the first base station, and the first base station includes the apparatus for determining a scheduling user shown in any one of FIG. 3-1 to FIG. 3-3.

Figures 1, 2, 3, 4:
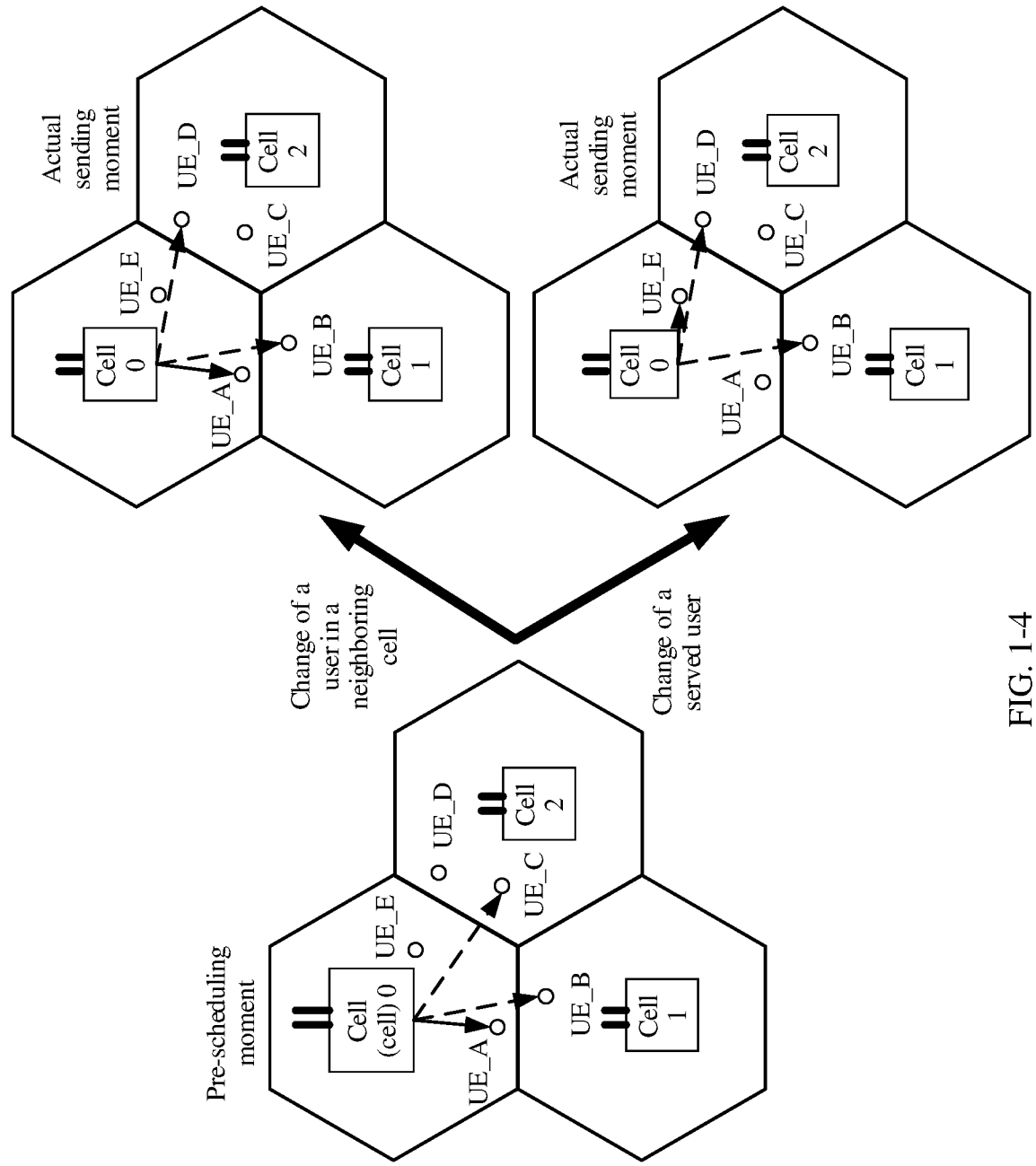
Figures 1, 2:
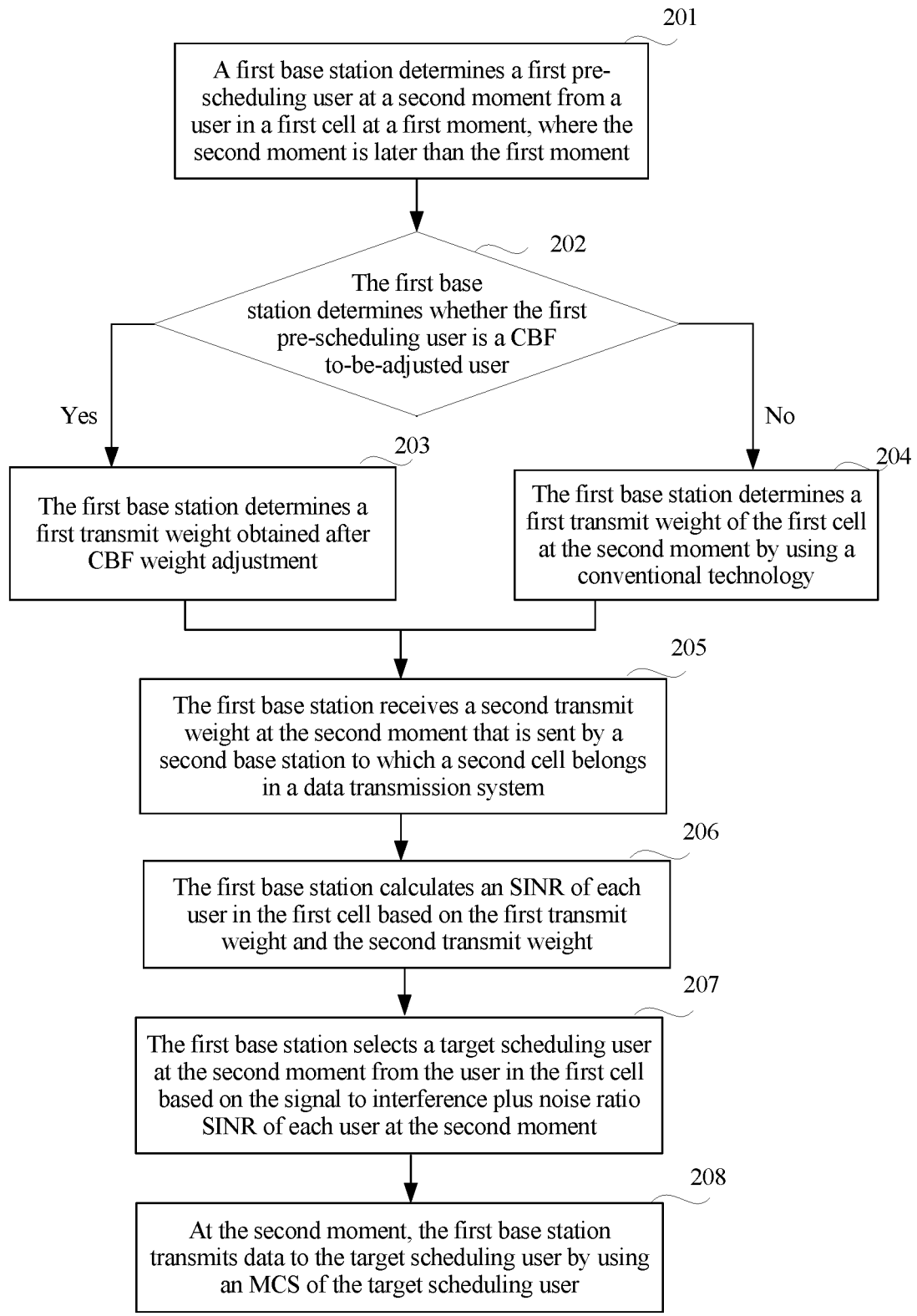
Figure 2:
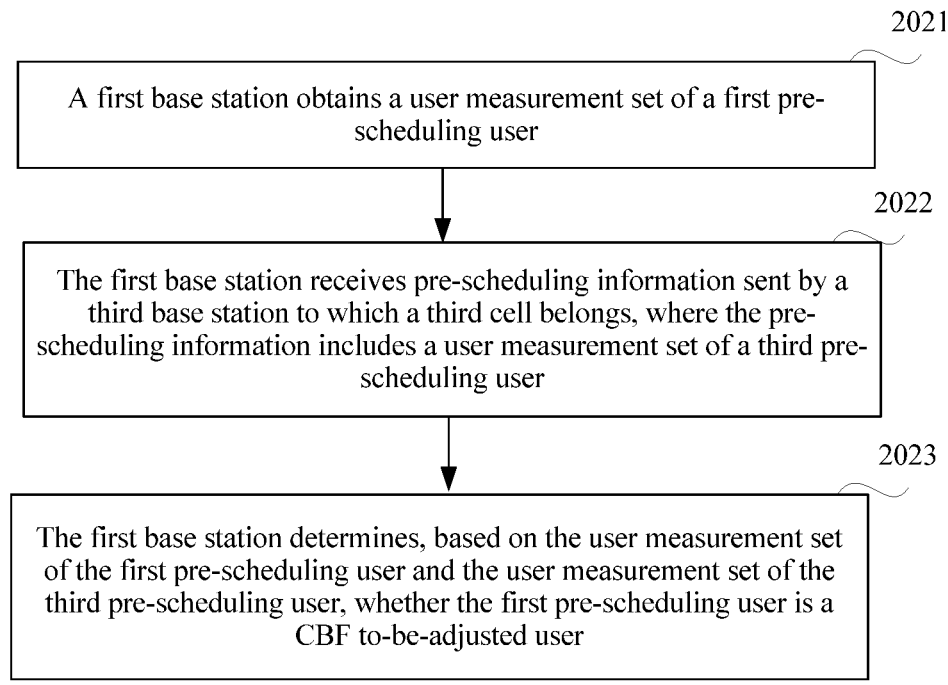
Figures 2, 3:
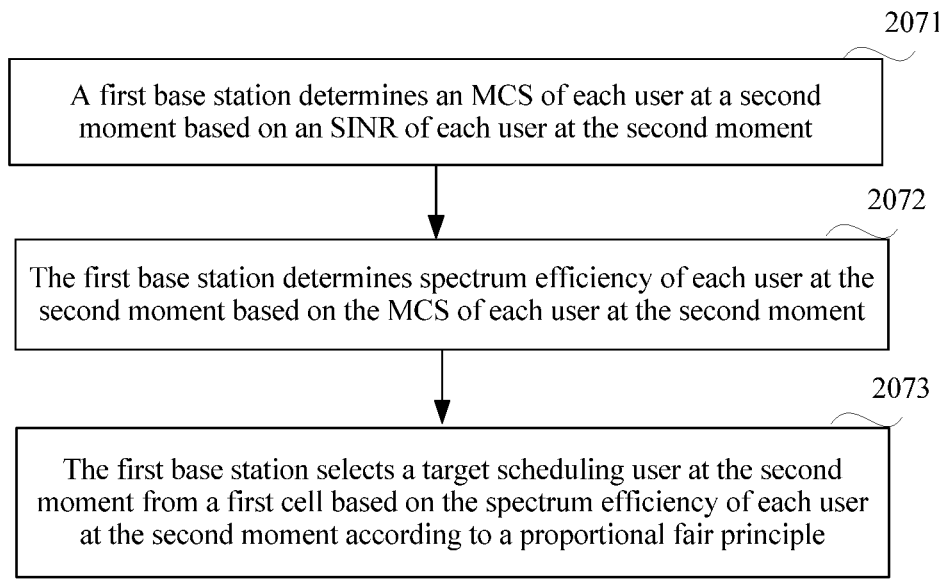
Figures 2, 3, 4:
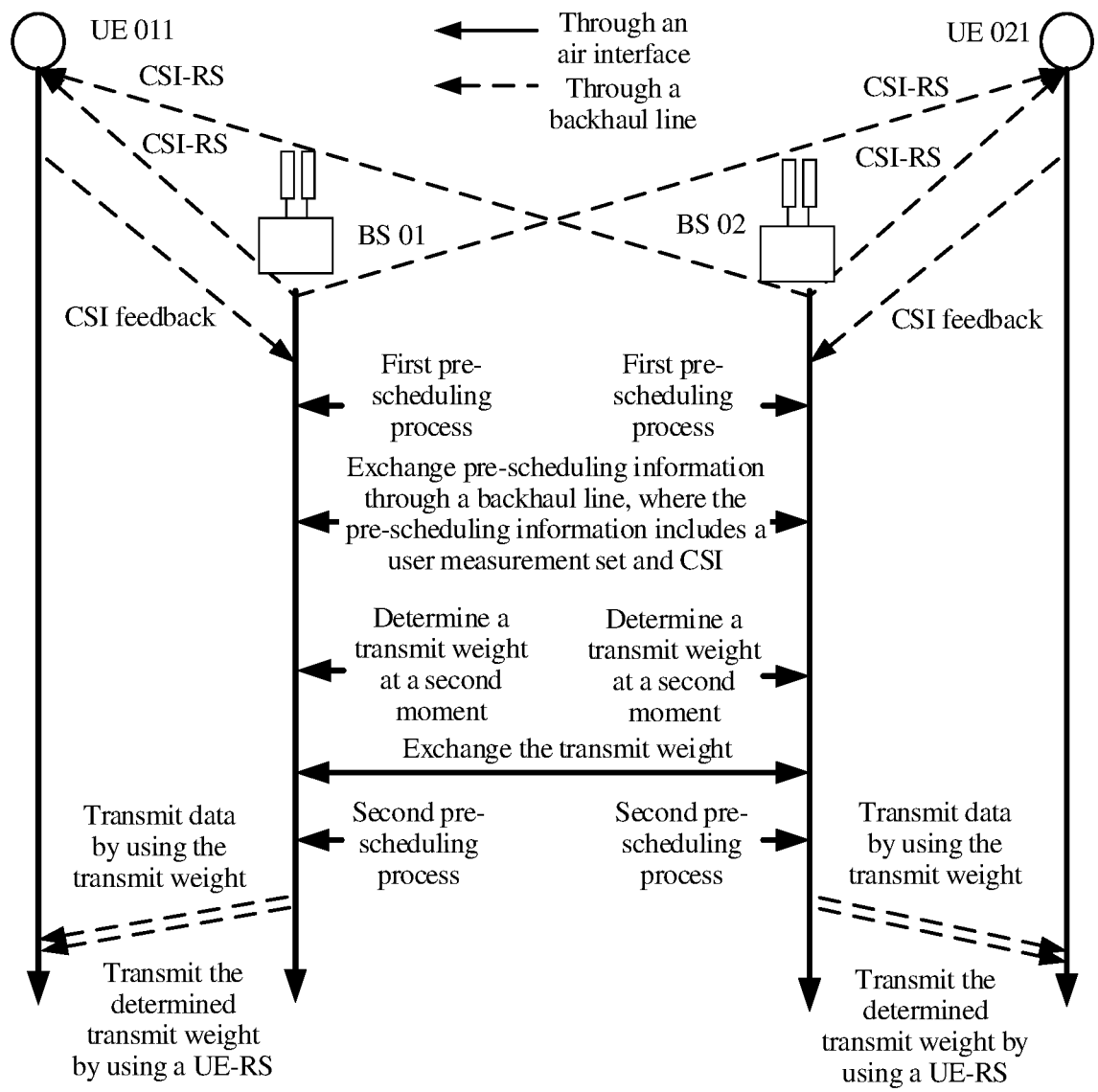
Figures 1, 3:
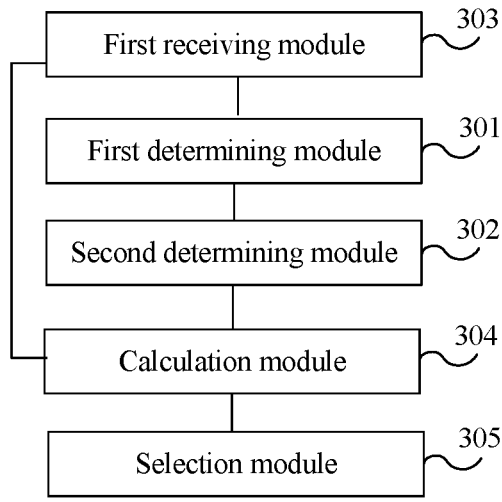
Figures 2, 3:
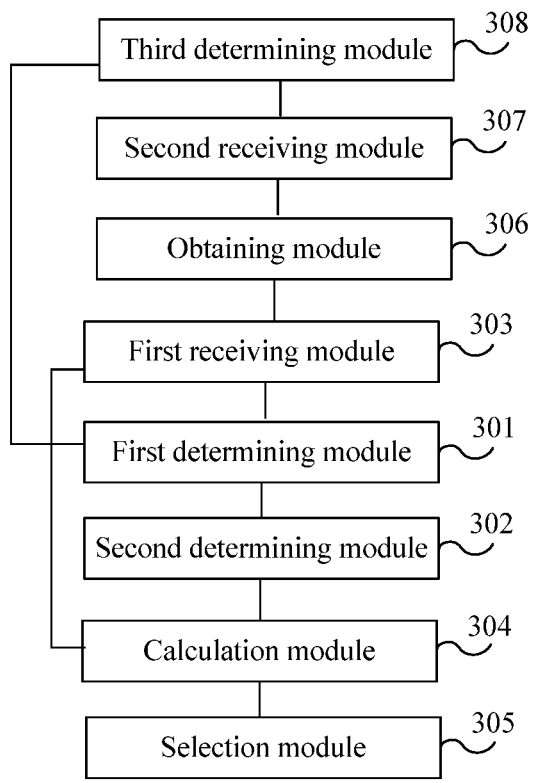
Figure 3:
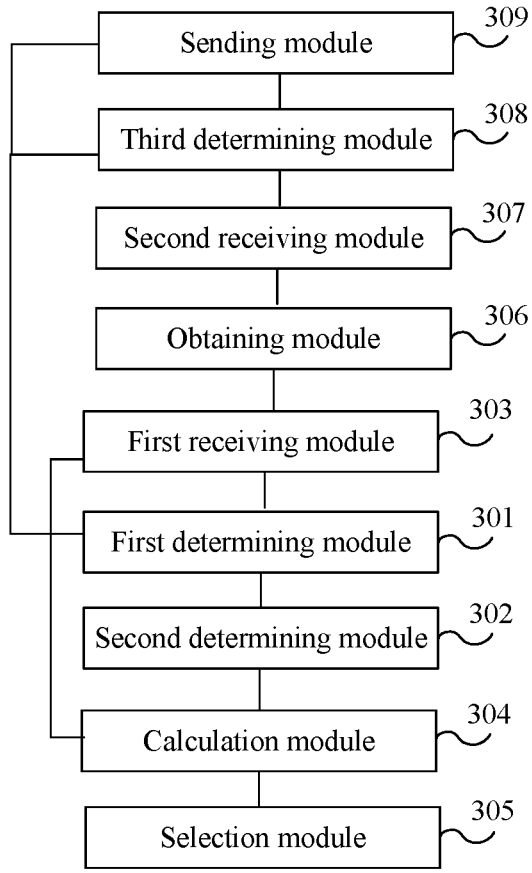
Figure 4:
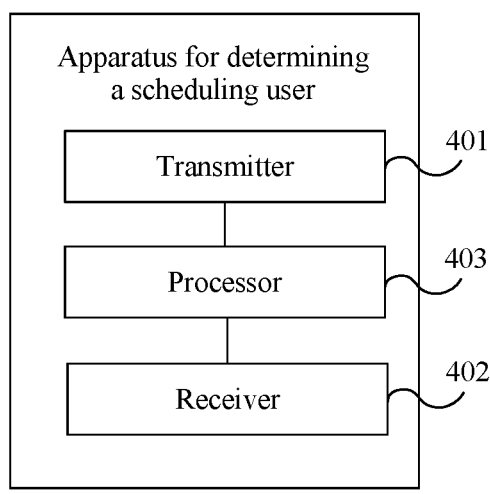

FIG. 4 is a schematic structural diagram of an apparatus for determining a scheduling user according to an example embodiment of this application. The apparatus may be disposed in a base station. As shown in FIG. 4, the apparatus may include a transmitter 301, a receiver 302, and a processor 303. The processor 303 may be configured to perform the method for determining a scheduling user shown in FIG. 2-1 to FIG. 2-3.

It may be understood by a person of ordinary skill in the art that, for the purpose of a convenient and brief description, for a detailed working process of the foregoing system, apparatus, and module, refer to a corresponding process in the foregoing method embodiments. Details are not described herein again.

All or some of the foregoing embodiments may be implemented by using software, hardware, firmware, or any combination thereof. When the embodiments are implemented by using software, all or some of the embodiments may be implemented in a form of a computer program product. The computer program product includes one or more computer instructions. When the computer program instructions are loaded and executed on a computer, all or some of the procedures or functions according to the embodiments are generated. The computer may be a general purpose computer, a computer network, or another programmable apparatus. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, microwave, or the like) manner. The computer readable storage medium may be any usable medium accessible by a computer, or a data storage device such as a server or a data center integrating one or more usable media. The usable medium may be a magnetic medium (for example, a floppy disk, a hard disk, or a magnetic tape), an optical medium, a semiconductor medium (for example, a solid state drive), or the like.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A method for determining a scheduling user, applied to a first base station in a data transmission system, the first base station comprising at least two antennas, and the first base station manages a first cell, the method comprising:

determining a first pre-scheduling user at a second moment from a user in the first cell at a first moment, wherein the second moment is later than the first moment;

determining a first transmit weight of the first cell at the second moment;

receiving a second transmit weight at the second moment that is sent by a second base station to which a second cell belongs in the data transmission system, wherein the second cell comprises a neighboring cell that meets a preset interaction condition and that is in a neighboring cell of the first cell;

calculating a signal to interference plus noise ratio (SINR) of each user in the first cell at the second moment based on the first transmit weight and the second transmit weight; and selecting a target scheduling user at the second moment from the user in the first cell based on the SINR of each user at the second moment, wherein the selecting of the target scheduling user at the second moment from the user in the first cell based on the SINR of each user at the second moment comprises:

determining a modulation and coding scheme (MCS) of each user at the second moment based on the SINR of each user at the second moment;

determining spectrum efficiency of each user at the second moment based on the MCS of each user at the second moment; and selecting the target scheduling user at the second moment from the first cell based on the spectrum efficiency of each user at the second moment according to a proportional fair principle.

2. The method according to claim 1, wherein the data transmission system is a time division duplex (TDD) system; and the calculating of the SINR of each user in the first cell at the second moment based on the first transmit weight and the second transmit weight comprises:

calculating an SINR of a first user k at the second moment by using a first signal-to-noise ratio calculation formula based on the first transmit weight and the second transmit weight, wherein the first signal-to-noise ratio calculation formula is as follows:

$$SINR_{k,l} = \frac{|H_{i,k} * w_{i,l}|^2}{noise + \sum_{y=1}^{Y} \sum_{f=1}^{F_y} |H_{y,k} * w_{y,f}|^2},$$

wherein the first user k is any user in the first cell at the second moment; $SINR_{k,l}$ represents an SINR of an $l^{th}$ stream of the first user k at the second moment; $H_{i,k}$ represents a channel from a first base station i to a first user k; y represents a target neighboring cell of the first user k, and the target neighboring cell is one of neighboring cells that can be measured by the first user k in the second cell; $H_{y,k}$ represents a channel from the neighboring cell y to the first user k; noise represents a noise floor of the first user; Y represents a total quantity of neighboring cells that can be measured by the first user k in the second cell; $w_{y,f}$ represents a transmit weight of an $f^{th}$ stream of the target neighboring cell y at the second moment; and Fy represents a total quantity of transmit streams of the target neighboring cell y at the second moment.

3. The method according to claim 1, wherein the data transmission system is a frequency division duplex (FDD) system; and the calculating of the SINR of each user in the first cell at the second moment based on the first transmit weight and the second transmit weight comprises:

calculating an SINR of a first user k at the second moment by using a second signal-to-noise ratio calculation formula based on the first transmit weight and the second transmit weight, wherein the second signal-to-noise ratio calculation formula is as follows:

$$SINR_{k,l} = \frac{RSRP_{k,i} * |w_{k,SU,l}^H * w_{k,CBF,l}|^2}{noise + \sum_{y=1}^{Y} \sum_{f=1}^{F_y} |\sqrt{RSRP_{k,y}} * w_{k,y}^H * w_{y,f}|^2},$$

wherein
the first user k is any user in the first cell at the second moment; $SINR_{k,l}$ represents an SINR of an $l^{th}$ stream of the first user k at the second moment; $RSRP_{k,i}$ represents an SINR measured by the first user k at the second moment from the first cell i to the first user; H represents calculating a conjugate transpose matrix; y represents a target neighboring cell of the first user k, and the target neighboring cell is one of neighboring cells that can be measured by the first user k in the second cell; $RSRP_{k,y}$ represents RSRP measured by the first user k at the second moment from the target neighboring cell y to the first user k; Y represents a total quantity of neighboring cells that can be measured by the first user k in the second cell; Fy represents a total quantity of transmit streams of the target neighboring cell y at the second moment; $w_{y,f}$ represents a transmit weight of an $f^{th}$ stream of the target neighboring cell y at the second moment; $w_{k,y}$ is used to represent a channel from the target neighboring cell y to the first user k; and a dimension of $w_{k,y}$ is the same as a dimension of $w_{y,f}$; the dimension of $w_{k,y}$ is represented by quantities of rows and columns of a precoding matrix corresponding to a PMI that is measured by the first user k based on information that a quantity of streams of the first user k is 1 and that is reported to the first base station; and
when coordinated beamforming (CBF) weight adjustment is performed on the first cell between the first moment and the second moment, $w_{k,SU,l}$ represents a transmit weight of the $l^{th}$ stream of the first user k before the CBF weight adjustment, and $w_{k,CBF,l}$ represents a transmit weight of the $l^{th}$ stream of the first user k after the CBF weight adjustment; or when coordinated beamforming CBF weight adjustment is not performed on the first cell between the first moment and the second moment, $w_{k,SU,l}$ is equal to $w_{k,CBF,l}$ and represents a transmit weight of the $l^{th}$ stream of the first user k at the second moment.

4. The method according to claim 1, wherein
after the determining of the first pre-scheduling user at the second moment from the user in the first cell, the method further comprises:
obtaining a user measurement set of the first pre-scheduling user, wherein the user measurement set of the first pre-scheduling user is used to record an interference source neighboring cell that interferes with the first pre-scheduling user and a degree of interference of RSRP of the interference source neighboring cell to the first pre-scheduling user;
receiving pre-scheduling information sent by a third base station to which a third cell belongs, wherein the pre-scheduling information comprises a user measurement set of a third pre-scheduling user, the third pre-scheduling user is a pre-scheduling user at the second moment that is determined by the third base station at the first moment, the user measurement set of the third pre-scheduling user is used to record an interference source neighboring cell that interferes with the third pre-scheduling user and a degree of interference of RSRP of the interference source neighboring cell to the third pre-scheduling user, and the third cell is a cell that is in the neighboring cell of the first cell and that is interfered with by the first cell or all neighboring cells of the first cell; and
determining, based on the user measurement set of the first pre-scheduling user and the user measurement set of the third pre-scheduling user, whether the first pre-scheduling user is a CBF to-be-adjusted user.

5. The method according to claim 4, wherein
the neighboring cell that meets the preset interaction condition and that is in the neighboring cell of the first cell is a base station to which the first base station sends a user measurement set within preset duration, and the preset duration is greater than or equal to a time interval between the first moment and the second moment; and
after the determining the first transmit weight of the first cell at the second moment, the method further comprises:
sending the first transmit weight to a base station to which an associated neighboring cell belongs, wherein the base station to which the associated neighboring cell belongs is a base station that sends a user measurement set to the first base station within the preset duration.

6. The method according to claim 4, wherein
the neighboring cell that meets the preset interaction condition and that is in the neighboring cell of the first cell is all the neighboring cells of the first cell; and
after the determining the first transmit weight of the first cell at the second moment, the method further comprises:
sending the first transmit weight to the second base station.

7. The method according to claim 4, wherein the pre-scheduling information further comprises channel state information (CSI) of the third pre-scheduling user; and
the determining of the first transmit weight of the first cell comprises:
obtaining CSI of a CBF coordinated user from the CSI of the third pre-scheduling user when the first pre-scheduling user is a CBF to-be-adjusted user, wherein the CBF coordinated user is the first n users that are most severely interfered with by the first cell in the third pre-scheduling user and that are determined by the first base station, and n is a threshold of a quantity of users that can be coordinated in the first cell; and
determining the first transmit weight of the first cell based on CSI of the first pre-scheduling user and the CSI of the CBF coordinated user by using eigenvector zero forcing (EZF), regularized eigenvector zero forcing (REZF), or a maximum signal to leakage plus noise ratio (SLNR).

8. An apparatus for determining a scheduling user, applied to a first base station in a data transmission system, the first base station comprising at least two antennas, and the first base station manages a first cell, the apparatus comprising:
a processor; and
a non-transitory computer-readable storage medium coupled to the processor and storing programming instructions for execution by the processor, the programming instructions instruct the processor to:
determine a first pre-scheduling user at a second moment from a user in the first cell at a first moment, wherein the second moment is later than the first moment;

determine a first transmit weight of the first cell at the second moment;
receive a second transmit weight at the second moment that is sent by a second base station to which a second cell belongs in the data transmission system, wherein the second cell comprises a neighboring cell that meets a preset interaction condition and that is in a neighboring cell of the first cell;
calculate a signal to interference plus noise ratio (SINR) of each user in the first cell at the second moment based on the first transmit weight and the second transmit weight; and
select a target scheduling user at the second moment from the user in the first cell based on the SINR of each user at the second moment,
wherein the programming instructions further instruct the processor to:
determine a modulation and coding scheme (MCS) of each user at the second moment based on the SINR of each user at the second moment;
determine spectrum efficiency of each user at the second moment based on the MCS of each user at the second moment; and
select the target scheduling user at the second moment from the first cell based on the spectrum efficiency of each user at the second moment according to a proportional fair principle.

9. The apparatus according to claim 8, wherein the data transmission system is a time division duplex (TDD) system; and
the programming instructions instruct the processor to:
calculate an SINR of a first user k at the second moment by using a first signal-to-noise ratio calculation formula based on the first transmit weight and the second transmit weight, wherein the first signal-to-noise ratio calculation formula is as follows:

$$SINR_{k,l} = \frac{|H_{i,k} * w_{i,l}|^2}{noise + \sum_{y=1}^{Y} \sum_{f=1}^{F_y} |H_{y,k} * w_{y,f}|^2},$$

wherein
the first user k is any user in the first cell at the second moment; $SINR_{k,l}$ represents an SINR of an $l^{th}$ stream of the first user k at the second moment; $H_{i,k}$ represents a channel from the first base station i to the first user k; y represents a target neighboring cell of the first user k; the target neighboring cell is one of neighboring cells that can be measured by the first user k in the second cell; $H_{y,k}$ represents a channel from the neighboring cell y to the first user k; noise represents a noise floor of the first user; Y represents a total quantity of neighboring cells that can be measured by the first user k in the second cell; $w_{y,f}$ represents a transmit weight of an $f^{th}$ stream of the target neighboring cell y at the second moment; and Fy represents a total quantity of transmit streams of the target neighboring cell y at the second moment.

10. The apparatus according to claim 8, wherein the data transmission system is a frequency division duplex FDD system; and
the programming instructions instruct the processor to:
calculate an SINR of a first user k at the second moment by using a second signal-to-noise ratio calculation formula based on the first transmit weight and the second transmit weight, wherein the second signal-to-noise ratio calculation formula is as follows:

$$SINR_{k,l} = \frac{RSRP_{k,i} * |w_{k,SU,l}^H * w_{k,CBF,l}|^2}{noise + \sum_{y=1}^{Y} \sum_{f=1}^{F_y} |\sqrt{RSRP_{k,y}} * w_{k,y}^H * w_{y,f}|^2},$$

wherein
the first user k is any user in the first cell at the second moment; $SINR_{k,l}$ represents an SINR of an $l^{th}$ stream of the first user k at the second moment; $RSRP_{k,i}$ represents an SINR measured by the first user k at the second moment from the first cell i to the first user; H represents calculating a conjugate transpose matrix; y represents a target neighboring cell of the first user k, and the target neighboring cell is one of neighboring cells that can be measured by the first user k in the second cell; $RSRP_{k,y}$ represents RSRP measured by the first user k at the second moment from the target neighboring cell y to the first user k; Y represents a total quantity of neighboring cells that can be measured by the first user k in the second cell; Fy represents a total quantity of transmit streams of the target neighboring cell y at the second moment; $w_{y,f}$ represents a transmit weight of an $f^{th}$ stream of the target neighboring cell y at the second moment; $w_{k,y}$ is used to represent a channel from the target neighboring cell y to the first user k; and a dimension of $w_{k,y}$ is the same as a dimension of $w_{y,f}$;
the dimension of $w_{k,y}$ is represented by quantities of rows and columns of a precoding matrix corresponding to a PMI that is measured by the first user k based on information that a quantity of streams of the first user k is 1 and that is reported to the first base station; and
when coordinated beamforming CBF weight adjustment is performed on the first cell between the first moment and the second moment, $w_{k,SU,l}$ represents a transmit weight of the $l^{th}$ stream of the first user k before the CBF weight adjustment, and $w_{k,CBF,l}$ represents a transmit weight of the $l^{th}$ stream of the first user k after the CBF weight adjustment; or when coordinated beamforming CBF weight adjustment is not performed on the first cell between the first moment and the second moment, $w_{k,SU,l}$ is equal to $w_{k,CBF,l}$ and represents a transmit weight of the $l^{th}$ stream of the first user k at the second moment.

11. The apparatus according to claim 8, wherein the programming instructions instruct the processor to:
obtain a user measurement set of the first pre-scheduling user after the first pre-scheduling user at the second moment is determined from the user in the first cell, wherein the user measurement set of the first pre-scheduling user is used to record an interference source neighboring cell that interferes with the first pre-scheduling user and a degree of interference of RSRP of the interference source neighboring cell to the first pre-scheduling user;
receive pre-scheduling information sent by a third base station to which a third cell belongs, wherein the pre-scheduling information comprises a user measurement set of a third pre-scheduling user, the third pre-scheduling user is a pre-scheduling user at the second moment that is determined by the third base station at the first moment, the user measurement set of the third pre-scheduling user is used to record an interference source neighboring cell that interferes with the third pre-scheduling user and a degree of interference of RSRP of the interference source neighboring cell to the third pre-scheduling user, and the third cell is a cell that is in the neighboring cell of the first cell and that is interfered with by the first cell or all neighboring cells of the first cell; and determine, based on the user measurement set of the first pre-scheduling user and the user measurement set of the third pre-scheduling user, whether the first pre-scheduling user is a CBF to-be-adjusted user.

12. The apparatus according to claim 11, wherein the neighboring cell that meets the preset interaction condition and that is in the neighboring cell of the first cell is a base station to which the first base station sends a user measurement set within preset duration, and the preset duration is greater than or equal to a time interval between the first moment and the second moment; and the programming instructions instruct the processor to:

after the first transmit weight of the first cell at the second moment is determined, send the first transmit weight to a base station to which an associated neighboring cell belongs, wherein the base station to which the associated neighboring cell belongs is a base station that sends a user measurement set to the first base station within the preset duration.

13. The apparatus according to claim 11, wherein the neighboring cell that meets the preset interaction condition and that is in the neighboring cell of the first cell is all the neighboring cells of the first cell; and the programming instructions instruct the processor to:

send the first transmit weight to the second base station after the first transmit weight of the first cell at the second moment is determined.

14. The apparatus according to claim 11, wherein the pre-scheduling information further comprises channel state information (CSI) of the third pre-scheduling user; and the programming instructions instruct the processor to:

obtain CSI of a CBF coordinated user from the CSI of the third pre-scheduling user when the first pre-scheduling user is a CBF to-be-adjusted user, wherein the CBF coordinated user is the first n users that are most severely interfered with by the first cell in the third pre-scheduling user and that are determined by the first base station, and n is a threshold of a quantity of users that can be coordinated in the first cell; and determine the first transmit weight of the first cell based on CSI of the first pre-scheduling user and the CSI of the CBF coordinated user by using eigenvector zero forcing (EZF), regularized eigenvector zero forcing (REZF), or a maximum signal to leakage plus noise ratio (SLNR).

* * * * *